(12) United States Patent
Endo et al.

(10) Patent No.: US 6,289,278 B1
(45) Date of Patent: Sep. 11, 2001

(54) VEHICLE POSITION INFORMATION DISPLAYING APPARATUS AND METHOD

(75) Inventors: Yoshinori Endo; Toshimichi Minowa, both of Mito; Kozo Nakamura, Hitachiota; Hiroshi Takenaga, Ibaraki-ken; Hiroto Morizane; Tokuji Yoshikawa, both of Hitachi; Mitsuru Nakamura, Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/258,153

(22) Filed: Feb. 26, 1999

(30) Foreign Application Priority Data

Feb. 27, 1998 (JP) .................................................. 10-046817

(51) Int. Cl.⁷ ................................................. G06F 165/00
(52) U.S. Cl. ............................ 701/208; 701/96; 701/211; 701/212; 701/214; 340/988; 340/990; 342/357.01; 342/357.13
(58) Field of Search .................................... 701/207, 208, 701/211, 212, 214, 216, 96; 340/988, 990, 995; 342/357.01, 357.02, 357.13

(56) References Cited

U.S. PATENT DOCUMENTS 5,729,109 * 3/1998 Kaneko .................................. 701/209
5,884,217 * 3/1999 Koyanagi .............................. 701/208
6,035,253 * 3/2000 Hayashi et al. ....................... 701/211

FOREIGN PATENT DOCUMENTS

| 0 590 588 | 4/1994 | (EP) . |
| 58-27678 | 2/1983 | (JP) . |
| 58-203524 | 11/1983 | (JP) . |
| 9-166452 | 6/1997 | (JP) . |
| WO 97/43600 | 11/1997 | (WO) . |

* cited by examiner

Primary Examiner—William A. Cuchlinski, Jr.
Assistant Examiner—Gertrude Arthur
(74) Attorney, Agent, or Firm—Crowell & Moring, L.L.P.

(57) ABSTRACT

A vehicle position information displaying apparatus and method are disclosed in which position information of a preceding vehicle is displayed in a manner superimposed on the form of a road under running of a user's vehicle generated from map information. The apparatus includes a present position detecting unit for detecting the present position of the user's vehicle, a running road selecting unit for selecting a road under running of the user's vehicle from the present position of the user's vehicle, an other vehicle detecting unit for detecting a distance to another vehicle and the azimuth of the other vehicle, an other vehicle position determining unit for determining the position of the other vehicle, and an other vehicle position displaying unit for developing the running road to a plane view or birds-eye view and displaying position information of the user's vehicle and the other vehicle in a manner superimposed on the developed running road.

27 Claims, 18 Drawing Sheets

VEHICLE POSITION INFORMATION DISPLAYING APPARATUS AND METHOD

BACKGROUND OF THE INVENTION

The present invention relates to a cruise control apparatus for motor vehicle, and more particularly to an apparatus and method in which position information of a peripheral vehicle around a user's vehicle or a preceding vehicle as the object of follow-up is displayed in a manner superimposed on a road form generated from map information.

In a cruise control apparatus for motor vehicle, it is general that in order to give information of the position and azimuth of a motor vehicle existing in the front, a method using peculiar hardware is employed or the display is provided on a graphics display unit possessed by a navigation device. In the method using the peculiar hardware, the fabrication cost is lowered by employing a system in which lumps such as LED's are continuously arranged so that an interval between a user's vehicle and a front vehicle is printed in accordance with the arranging positions of LED's and corresponding LED's are excited into illumination on the basis of measured relative distance information to inform the user of the relative distance.

On the other hand, in the system in which the display is provided on a graphics display unit such as LCD or CRT possessed by a navigation device or the like, it is general to employ a method in which a virtual straight road is generated and marks indicative of a user's vehicle and a front vehicle and a scale for grasping a relative distance are displayed on the generated virtual straight road. As a further high technique, there is a method in which an image of a running road is produced by an image pickup device such as CCD to extract the outlines of the road therefrom and marks indicative of a user's vehicle and a front vehicle and a scale for grasping a relative distance are displayed on the obtained road form. Also, there is a method which uses a distance measuring device or equipment (DME) using millimeter waves or a laser, that is, a method in which the form of a road is determined from information of a reflected version of a transmitted signal from a guard rail or the like existing in the side of the road and marks indicative of a user's vehicle and a front vehicle and a scale for grasping a relative distance are displayed on the obtained road form.

In a cruise control apparatus for motor vehicle, it is desired that the position of a motor vehicle existing in the front is displayed in a manner superimposed on an actual road form. This is because it is desirable to provide a clarified display as to whether the front vehicle is running on a lane under running of a user's vehicle or on a lane adjacent to the running lane. Such display is desired in the case of a curved road or the like. Further, it is desirable to display such information at a low cost and in a form capable of being easily understood by the user. In order to provide the easily understandable display, it is desirable that information on a display screen is made as simple as possible.

On the other hand, the conventional method using the peculiar hardware has neither means for recognizing the form of a road nor means for displaying it. In the method in which a virtual straight road is generated, an image different from the actual road form is generated so that it is not possible to provide the above-mentioned desirable display in a manner superimposed on the actual road form. The method using the image pickup device has a problem that the outlines of a road are undeterminable under a meteorological condition such as snow or mist as well as a problem that the system becomes high in cost. The method using the distance measuring device for determination of the form of a guard rail or the like to extract the outlines of a road has a problem that the determination of road outlines is difficult for a road which has not a guard rail or the like.

SUMMARY OF THE INVENTION

An object of the present invention made for solving the above-mentioned problems is to provide a low-cost and high-accuracy vehicle position information displaying apparatus and method in which position information of a user's vehicle and position information of a front vehicle are displayed in a manner superimposed on an actual road form. Another object of the present invention is to provide such apparatus and method in which a road subjected to the display of the road form can be limited to a running road, thereby simplifying or reducing the amount of displayed information.

According to a construction in the present invention for displaying the position of another (or peripheral) vehicle around a user's vehicle in a manner superimposed on an actual road form, a road under running of the user's vehicle is identified by use of position measuring means possessed by a navigation device and a map database to generate road outline information from information of the identified road, and the positions of the user's vehicle and a preceding vehicle existing in the front of the user's vehicle (and a peripheral vehicle other than the preceding vehicle existing around the user's vehicle) are displayed in a manner superimposed on the generated road form. The road under running of the user's vehicle is selected from map data stored in the map data-base, thereby simplifying or reducing the amount of displayed information.

DESCRIPTION OF THE PREFERRED EMBODIMENTS

Embodiments of a vehicle position information displaying apparatus according to the present invention will be described in reference to the drawings.

Figure 1:
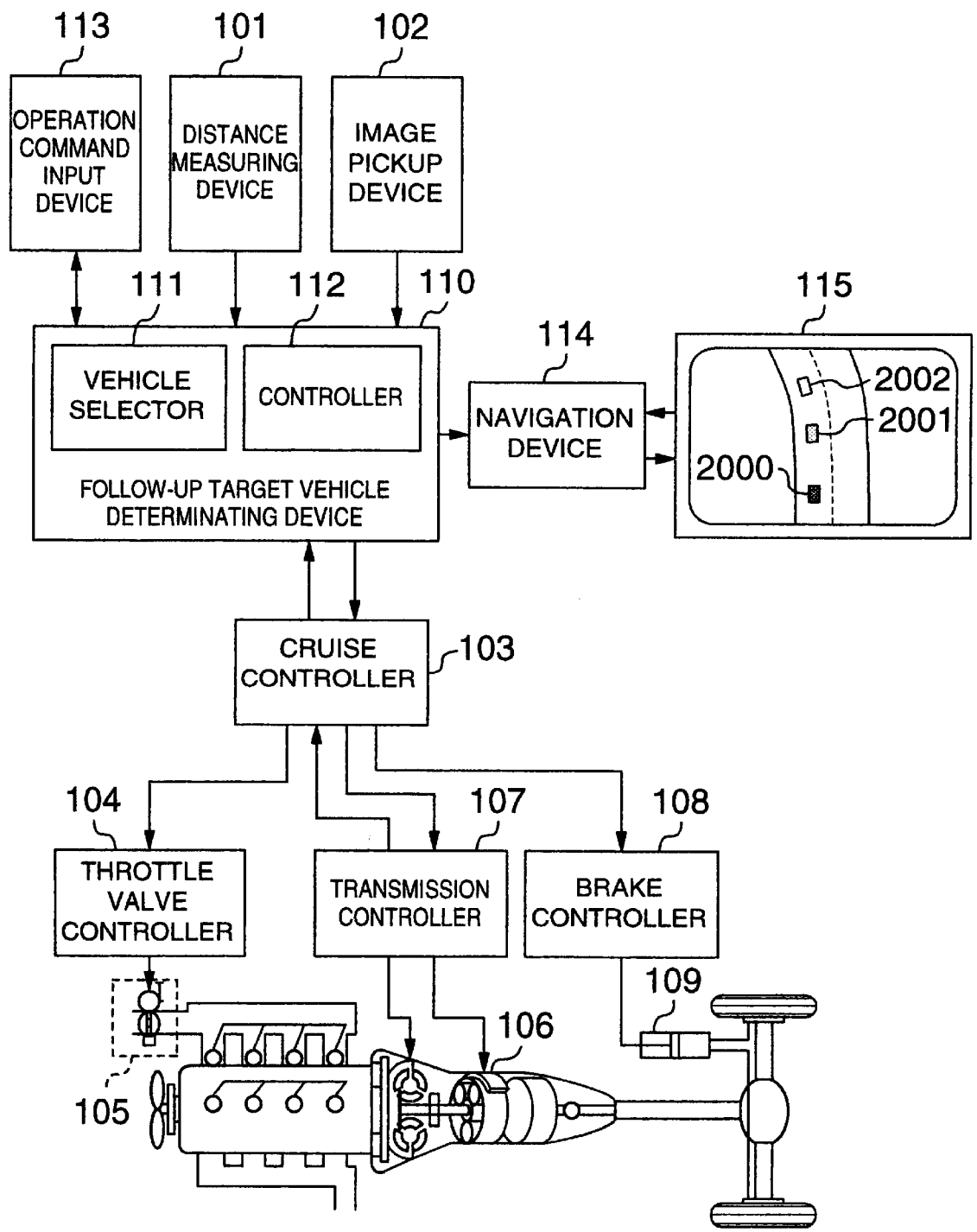
FIG. 1 is a systematic diagram showing the construction of a vehicle position information displaying apparatus according to an embodiment of the present invention.

FIG. 1 is a systematic diagram showing the construction of a vehicle position information displaying apparatus according to an embodiment of the present invention. The apparatus includes a distance measuring device or equipment (DME) 101 for measuring a distance between a user's vehicle and an object existing in the front, rear or lateral side of the user's vehicle and the azimuth of the user's vehicle, an image pickup device 102 for imaging the neighborhood of the user's vehicle, a cruise controller 103 provided with a function of controlling a driving mechanism of the user's vehicle (including an engine and a transmission) so that the user's vehicle runs while maintaining the speed of the user's vehicle or an inter-vehicle distance between the user's vehicle and a preceding vehicle at a target value, a navigation device 114 for displaying an image obtained by the image pickup device 102, internal information of the cruise controller 103, and control information including an output command value, a display unit 115 for displaying a graphics output of the navigation device 114, an operation command input device 113 for inputting an operation command for the system by the user, a throttle valve controller 104 for controlling a throttle valve actuator 105 on the basis of each command value from the cruise controller 103 which actuator operates a throttle valve, a transmission controller 107 for controlling the speed changing operation of a transmission 106, and a brake controller 108 for controlling a brake actuator 109 which operates a brake.

The distance measuring device 101 may be realized by, for example, a radio radar or a laser radar. The distance measuring device 101 is provided at the front, rear, lateral side or the like of the user's vehicle and outputs information including a distance between the user's vehicle and an object such as a motor vehicle existing around the user's vehicle, the azimuth of the user's vehicle, and so forth. Specific means for realizing such distance measurement includes a method as shown by JP-A-58-27678 or a measuring method using a radio radar by which radio waves are emitted in a running direction so that the speeds (or range rates), inter-vehicle distances (or ranges) and azimuths of a user's vehicle relative to a plurality of peripheral vehicles are measured from Doppler frequencies superimposed on reflected return waves, and a method as shown by JP-A-58-203524 or a measuring method using a pulsed laser radar by which a laser beam is outputted so that an inter-vehicle distance is measured from a time until a reflected beam returns.

The image pickup device 102 may be realized by, for example, a CCD camera. The image pickup device 102 outputs a video signal obtained through the imaging of the front, rear and side of the user's vehicle.

The operation command input device 113 may be realized by an ordinary hardware switch such as a push switch, or the combination of a microphone for receiving a voice or speech command and an analyzer for analyzing the voice command.

The cruise controller 103, when the start of an operation thereof is instructed by the operation command input device 113, controlling the driving mechanism so that the user's vehicle runs with the speed or inter-vehicle distance of the user's vehicle relative to a preceding vehicle being maintained at a set constant value even if the user's foot is released from an accelerator pedal.

A follow-up target vehicle determining device 110 determines a vehicle which is made a target for follow-up (hereinafter referred to as follow-up target vehicle) in the case where the cruise controller 103 operates a control function of performing the running with an inter-vehicle distance maintained at a set value (hereinafter referred to as follow-up running control function). The follow-up target vehicle determining device 110 is constructed by, for example, a vehicle selector 111 for selecting one of vehicles to be followed on the basis of information of front vehicles from the distance measuring device 101 and the image pickup device 102 and a controller 112 for controlling the cruise controller 103 to take the selected vehicle as a follow-up target vehicle. The selection of the vehicle to be followed is made in such a manner that each of objects subjected to the measurement of the distances and azimuths thereof by the distance measuring device 101 is judged as to whether or not that vehicle satisfies conditions which are previously set concerning an inter-vehicle distance, relative speed, relative angle and so forth thereof for the user's vehicle and should be satisfied by running vehicles to be followed.

The navigation device 114 operates to select a road under running of the user's vehicle on the basis of peripheral vehicle information obtained by the distance measuring device 101 and the image pickup device, present position measuring means possessed by the navigation device, and map information stored in the navigation device so that the form of the selected road is displayed on the display unit 115. Such generation of the running road form using the map information stored in the navigation device enables more realistic display of the road. Further, the navigation device 114 operates to determine the displaying position of the user's vehicle so that it is fixed at one predetermined point on the display unit. Also, the navigation device 114 operates to display a mark 2000 (for example, see FIG. 16) indicative of the position of the user's vehicle, a mark 2001 indicative of the position of a preceding vehicle and a mark indicative of a peripheral vehicle other than the preceding vehicle in a manner super-imposed on the road. Accordingly, the distances between the user's vehicle and the peripheral vehicles can easily be discriminated. It is preferable that the marks indicative of the positions of the user's vehicle, the preceding vehicle and the peripheral vehicle other than the preceding vehicle are provided with different displaying configurations, that is, changed colors or patterns. Thereby, the user can easily discriminate the type of information indicated by each mark.

Figure 2:
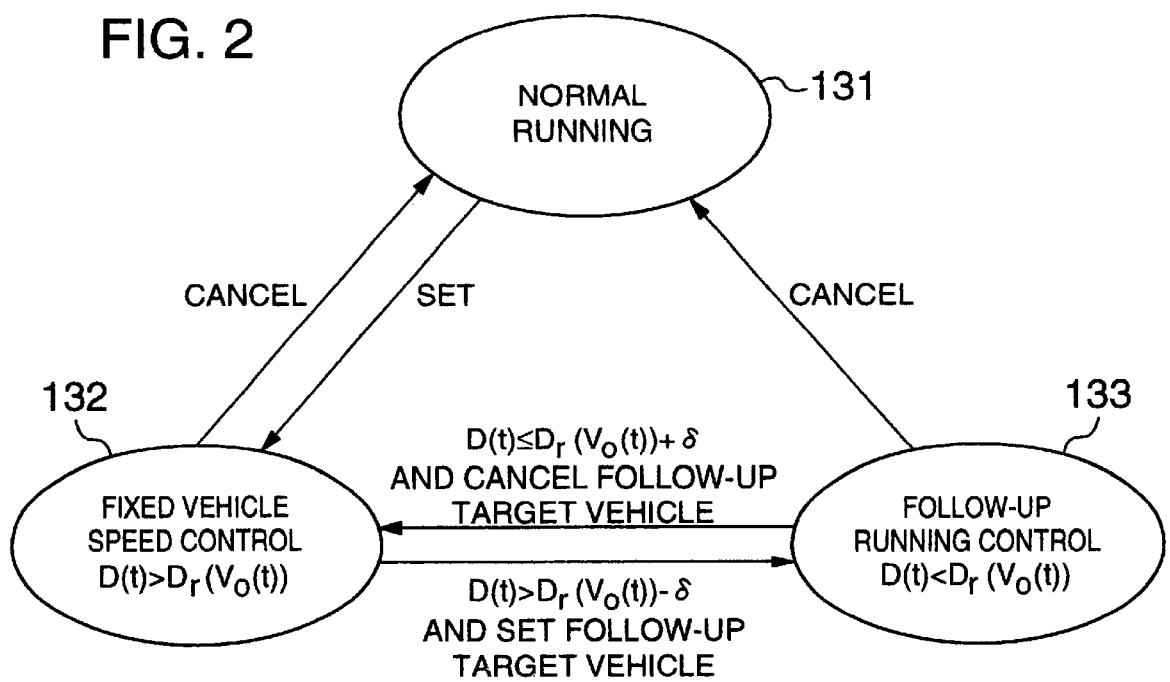
FIG. 2 is a diagram for explaining a state transition under the control of a cruise controller shown in FIG. 1.
Figure 3:
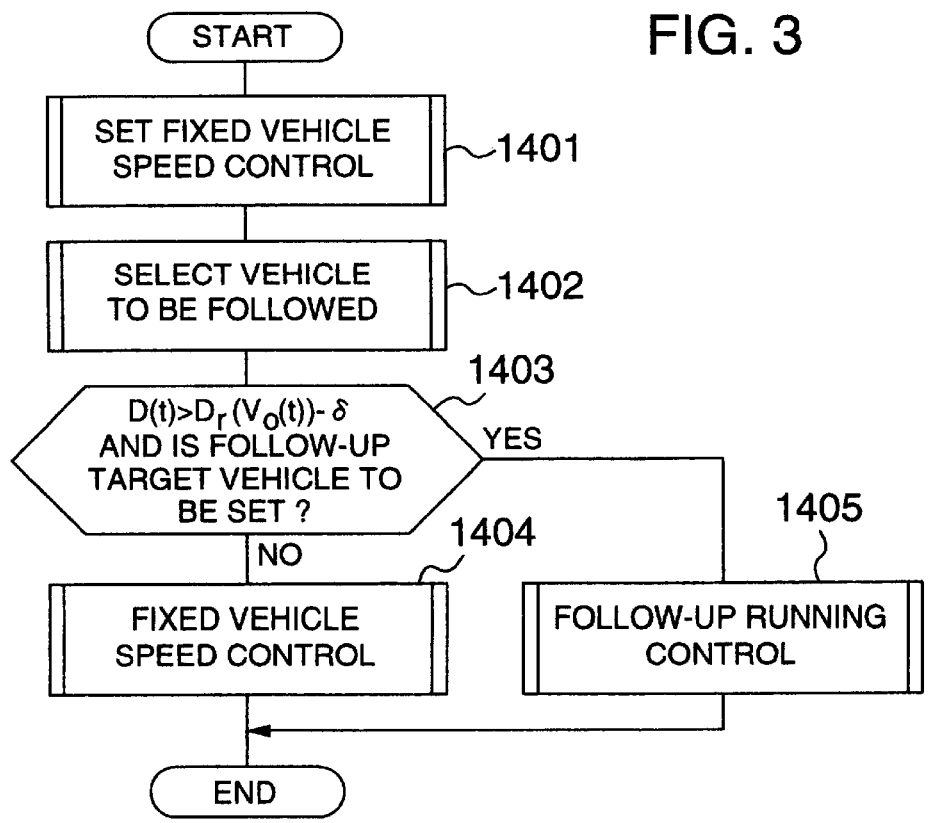
FIG. 3 is a flow chart for explaining a state change processing performed by the cruise controller.

Next, the outline of the follow-up running control of the operations of the vehicle position information displaying apparatus according to the present embodiment will be described in reference to a state transition diagram shown in FIG. 2 and a flow chart of a state change processing shown in FIG. 3.

In the follow-up running control in the present embodiment, the running condition of the vehicle is classified into three states including the state of normal running 131, the state of fixed vehicle speed control 132 and the state of follow-up running control 133. When a cruise control is instructed through the operation command input device 113 at the state of normal running 131, a processing 1401 is performed so that a state transition is made from the state of normal running 131 to the state of fixed vehicle speed control 132 of causing the vehicle to run in a fixed speed condition.

In a processing 1402, a front vehicle to be followed is selected on the basis of the inter-vehicle distances, speeds, angles and so forth of the user's vehicle relative to the other vehicles which are obtained by the distance measuring device 101 and the image pickup device 102.

In a processing 1403, the judgement is made of whether or not the inter-vehicle distance D(t) for the running vehicle to be followed selected in the processing 1402 is smaller than a target inter-vehicle distance $Dr(V_0)$ determined by the speed $V_0$ of the user's vehicle. In the case where the inter-vehicle distance D(t) is smaller than the target inter-vehicle distance $Dr(V_0)$, a follow-up running control processing 1405 for transition from the state of fixed vehicle speed control 132 to the state of follow-up running control 133 is performed. In the case where the inter-vehicle distance D(t) is larger than the target inter-vehicle distance $Dr(V_0)$ determined by the speed of the user's vehicle, a processing 1404 is performed with the state of fixed vehicle speed control 132 being maintained. In the fixed vehicle speed control processing 1404, calculation is performed for controlling the opening angle of the throttle valve so that the speed of the user's vehicle takes a value determined by the user or driver.

The contents of the follow-up running control processing 1405 shown in FIG. 3 will be described using FIGS. 4 and 5.

Figure 4:
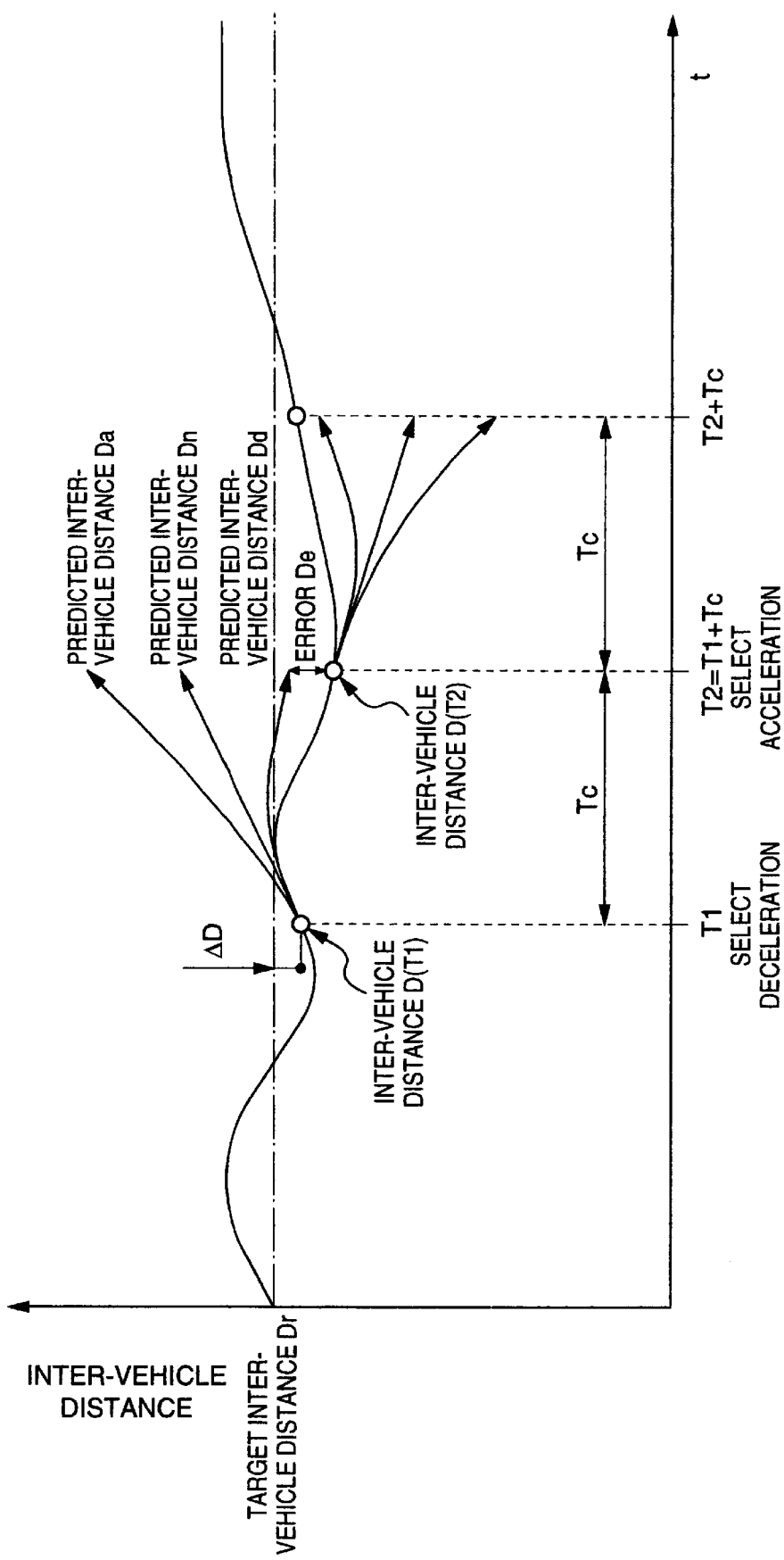
FIG. 4 is a diagram for explaining the concept of a predicted inter-vehicle distance control system.
Figure 5:
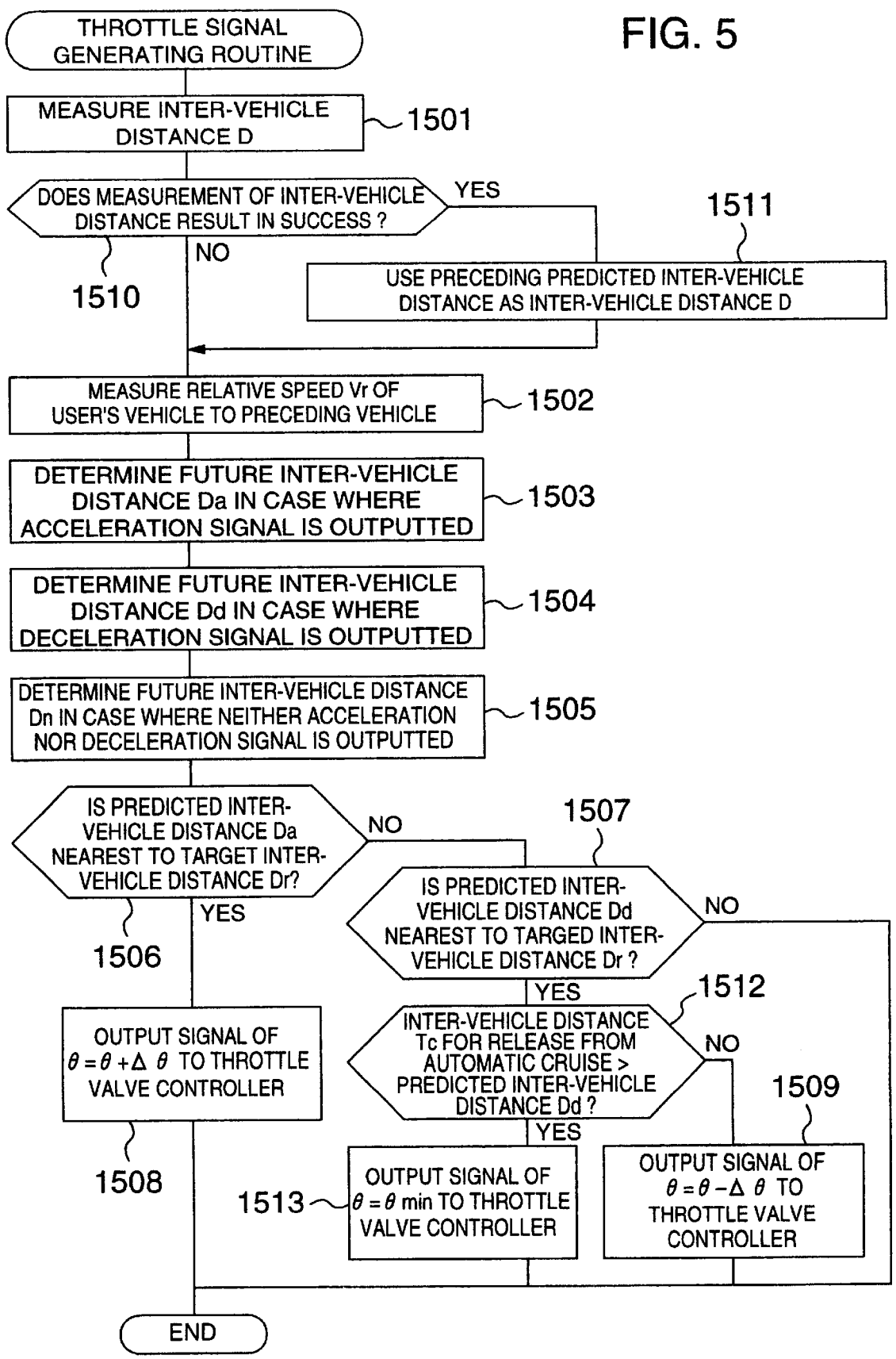
FIG. 5 is a flow chart showing a throttle command signal generating routine.

FIG. 4 shows a conceptual diagram of a control system using predicted inter-vehicle distances Da, Dn and Dd between the follow-up target vehicle and the user's vehicle. There is assumed the case where the inter-vehicle distance D oscillates around the target inter-vehicle distance Dr and the inter-vehicle distance D(T1) between the user's vehicle and the follow-up target vehicle at present time T1 has a deviation ΔD.

In the shown example, the inter-vehicle distance Da at time T2, in the case where the user's vehicle is accelerated at present time T1, is predicted by use of a vehicle model in a processing which will be mentioned later on. Similarly, there are predicted the inter-vehicle distance Dd at time T2 in the case where a deceleration control is performed and the inter-vehicle distance Dn at time T2 in the case where the user's vehicle runs as it is. The predicted values are shown in FIG. 4. In the shown example, the running control is made by performing a processing for selecting one of the three predicted values Da, Dn and Dd nearest to the target inter-vehicle distance Dr.

A routine for generating a throttle command signal to be outputted for vehicle speed control in the follow-up running control in the present example will be described referring to a flow chart shown in FIG. 5.

In a processing 1501, an inter-vehicle distance D between a preceding running vehicle and the user's vehicle is measured using the distance measuring device 101.

In a processing 1510, the judgement is made of whether or not the measurement of the inter-vehicle distance D results in success. If the inter-vehicle distance D is normally measured, the flow branches to a processing 1502. In the case where the measurement results in failure, the flow branches to a processing 1511 in which the preceding predicted inter-vehicle distance is used as the value of the inter-vehicle distance D.

Figure 6:
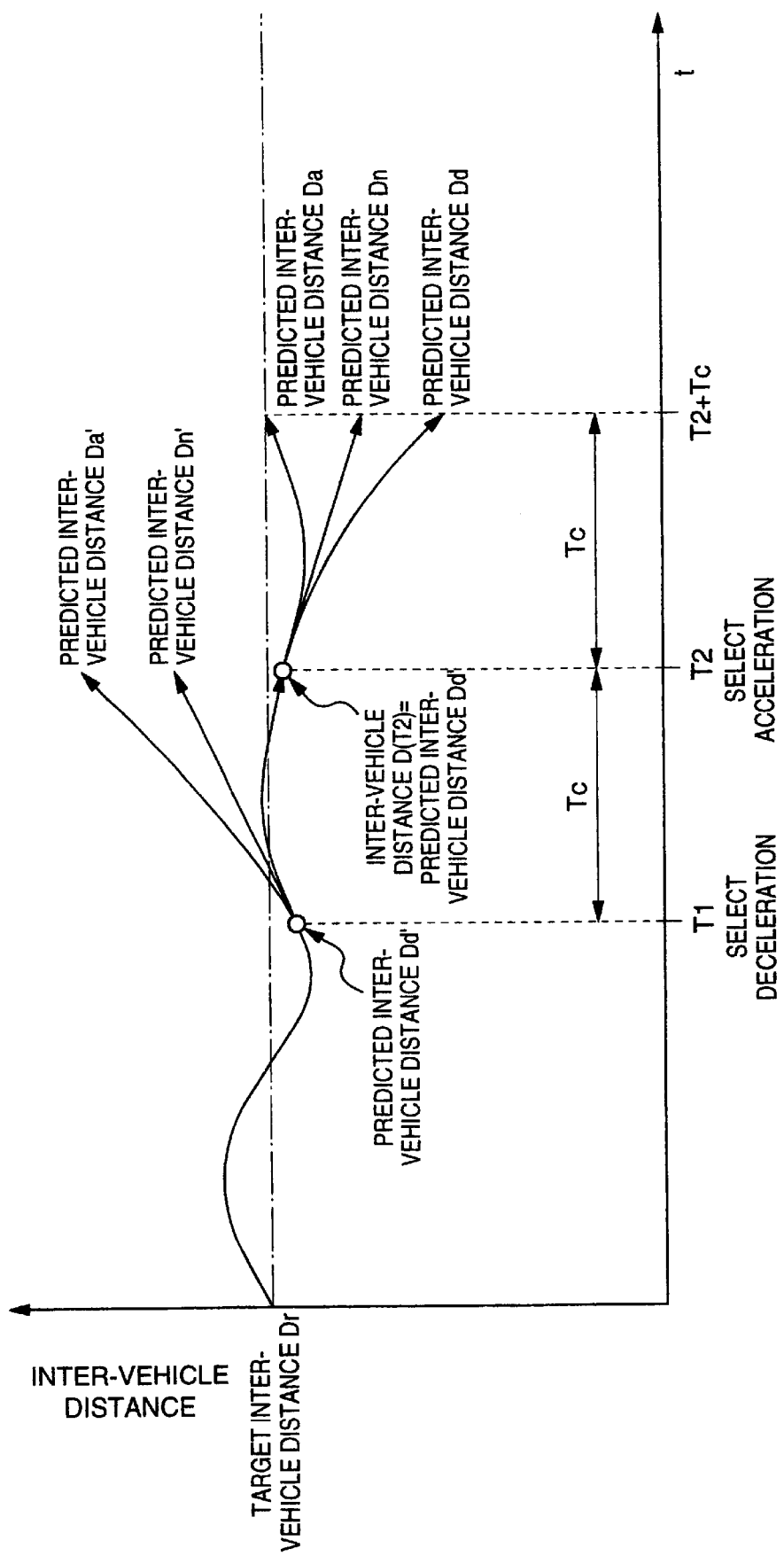
FIG. 6 is a diagram showing a first example of the predicted inter-vehicle distance control system.

FIG. 6 shows an example in which the preceding predicted inter-vehicle distance is used as the value of the inter-vehicle distance D. At time T1, a deceleration signal was outputted as the result of operation at time T1. In the case where the measurement of the inter-vehicle distance D at time T2 results in failure, predicted inter-vehicle distances Da, Dn and Dd at time T2+Tc are thereinstead determined by use of a predicted inter-vehicle distance Dd' determined at time T1. And, an acceleration signal providing a predicted inter-vehicle distance Da nearest to the target inter-vehicle distance Dr is outputted. However, since the predicted inter-vehicle distance Dd' is determined by use of the vehicle model shown in FIG. 4, there is an error De (see FIG. 4) from an inter-vehicle distance D at time T2 in the case where the measurement results in success. Accordingly, the continuous use of this predicted inter-vehicle distance Dd' is not preferable since the error is accumulated. The maximum number of times of continuous use of the predicted inter-vehicle distance is limited to, for example, 3. In the case where the failure of the measurement of the inter-vehicle distance D continues beyond 3 times, the follow-up running control mode 133 is temporarily stopped and the running in the fixed vehicle speed control mode 132 is performed until the measurement of the inter-vehicle distance D results in success.

The processing 1502 is required only in the case where only the measurement of an inter-vehicle distance is possible, as in the case where a pulsed radar is used. If the measurement of a relative vehicle speed is possible, as in a CW system such as a radio radar, the processing 1502 may be omitted. In the processing 1502, a relative speed Vr can approximately be determined, for example, in such a manner that a difference between an inter-vehicle distance D' preceding by one sampling period and the present inter-vehicle distance D is divided by one sampling period.

In a processing 1503, there is determined a predicted inter-vehicle distance Da in the case where an acceleration signal is outputted. The inter-vehicle distance Da at time T2 is predicted by inputting+α (corresponding to acceleration) to the vehicle model prepared beforehand.

In a processing 1504, there is predicted a future inter-vehicle distance Dd in the case where a deceleration signal is outputted. The predicted inter-vehicle distance Dd is determined by inputting–α (corresponding to deceleration) in a manner similar to that in the processing 1503.

In a processing 1505, there is predicted a future inter-vehicle distance Dn in the case where neither an acceleration nor deceleration signal is outputted.

A search for one of the thus predicted inter-vehicle distances Da, Dn and Dd nearest to the target inter-vehicle distance Dr is made in processings 1506 and 1507. In the case where the predicted inter-vehicle distance nearest to the target inter-vehicle distance Dr is Da when the acceleration signal is outputted, the flow branches from the processing 1506 to a processing 1508. In the other cases, the flow branches to the processing 1507. In the processing 1508, a signal for increasing the throttle valve opening angle by Δθ is outputted to the throttle valve controller 104, thereby completing the flow.

In the case where it is determined in the processing 1507 that the predicted inter-vehicle distance nearest to the target inter-vehicle distance Dr is Dd when the deceleration signal is outputted, the flow branches to a processing 1512. In the case where neither acceleration nor deceleration is required or the present throttle valve opening angle is maintained, the flow is completed as it is. In the processing 1512, the predicted inter-vehicle distance Dd is compared with an inter-vehicle distance Dc with which the release from automatic cruise is made. If Dc≦Dd, the flow branches to a processing 1509. If Dc>Dd, the flow branches to a processing 1513. In the processing 1509, a signal for decreasing the throttle valve opening angle by Δθ is outputted to the throttle valve controller 104, thereby completing the flow.

Figure 7:
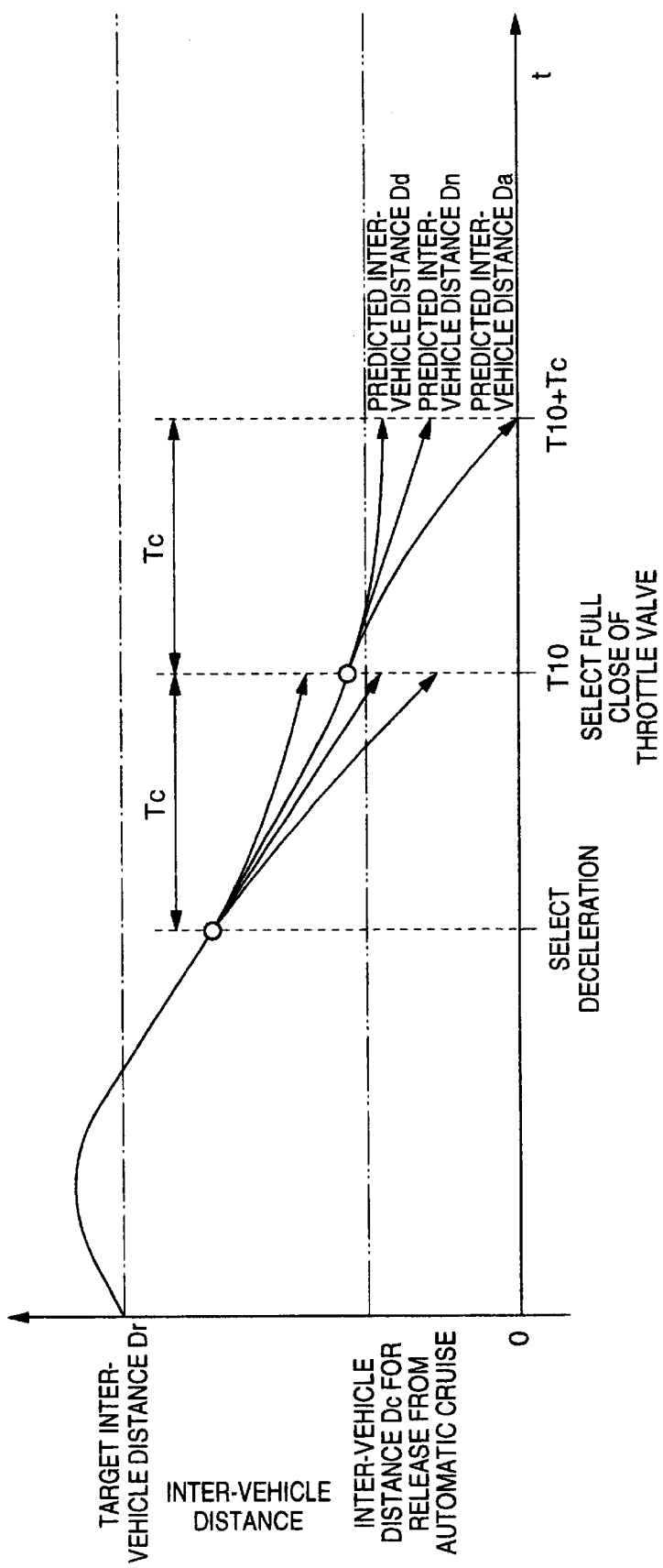
FIG. 7 is a diagram showing a second example of the predicted inter-vehicle distance control system.

In the processing 1513, a signal for setting the throttle valve opening angle to full close (Δθ min) is outputted to the throttle valve controller 104. FIG. 7 shows an example of the predicted inter-vehicle distance in the case where the branch to the processing 1513 is taken. Predicted inter-vehicle distances Da, Dn and Dd at time T10+Tc are determined from an inter-vehicle distance D at time T10. In the present example, it is shown that if an acceleration signal is outputted, the predicted inter-vehicle distance Dd takes zero so that the user's vehicle collides with the preceding vehicle. Even if a deceleration signal is outputted, the predicted inter-vehicle distance Dd is smaller than Dc so that it remains as a very dangerous inter-vehicle distance. By setting the throttle valve opening angle to full close to apply a strong engine brake so that the deceleration is made, the collision is prevented. The inter-vehicle distance Dc with which the throttle opening angle is set to full close is set for each vehicle.

Figure 8:
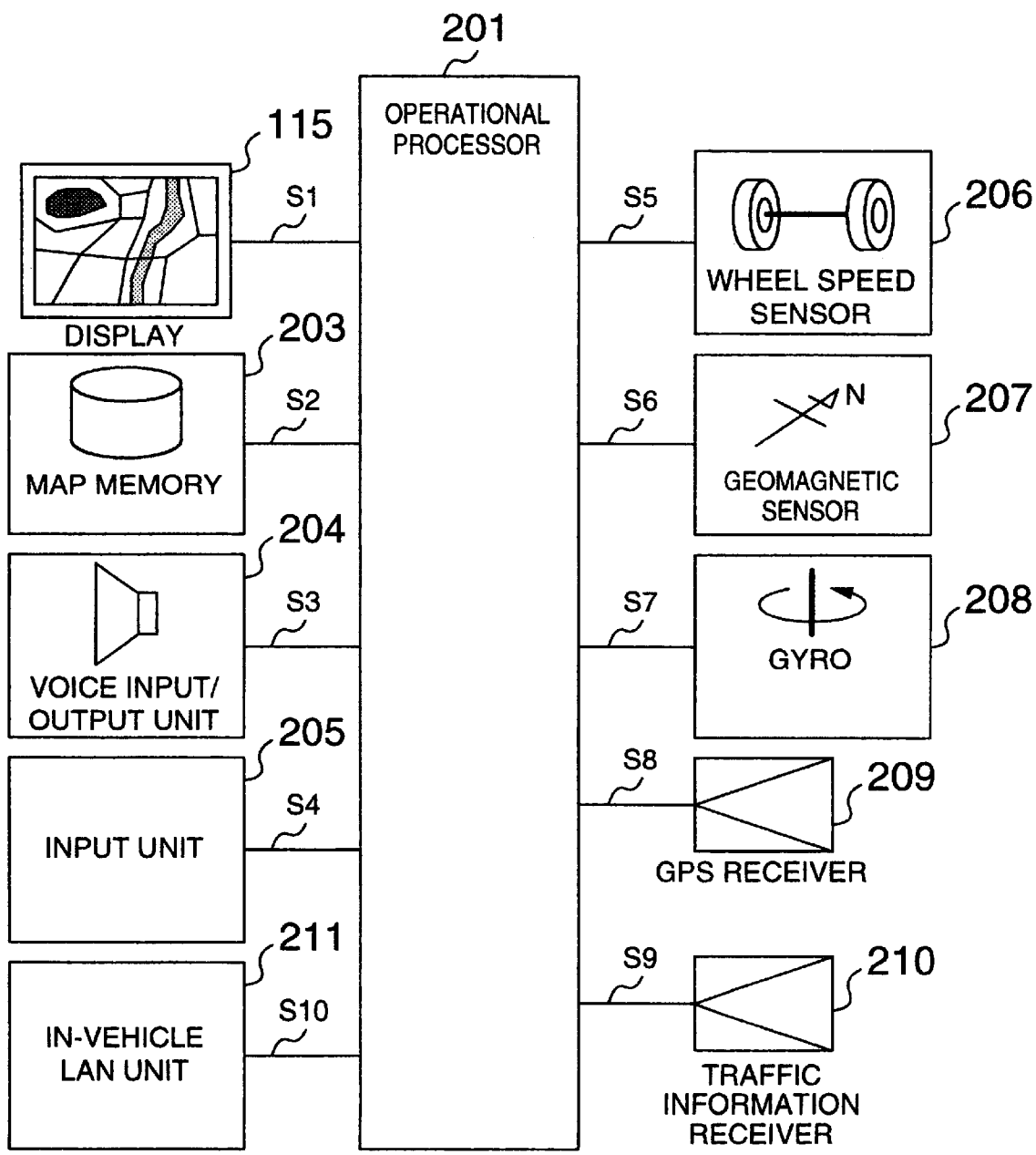
FIG. 8 is a diagram showing the construction of a navigation device shown in FIG. 1.

FIG. 8 is a diagram for explaining an example of the construction of the navigation device 114. Each constituent unit of the navigation device will now be described.

An operational processor 201 is a central unit for performing various processings which include detecting a present position on the basis of sensor information outputted from various sensors 206 to 209, reading map mesh data necessary for display of a running road from a map memory 203 on the basis of the obtained present position information, graphically developing the map data so that a mark indicative of the position of a user's vehicle and a mark indicative of the position of a peripheral vehicle measured by the distance measuring device 101 are displayed on the display unit 115 in a manner superimposed on the developed map, and selecting an optimum route connecting the present place and a destination designated by the user so that the selected route is displayed in a manner superimposed on the running road on the display unit 115, thereby inducing the user to the destination.

The display unit 115 is a unit for displaying graphics information generated by the operational processor 201. The display unit 115 may be constructed by a CRT or a liquid crystal display. It is general that a signal S1 between the operational processor and the display unit is a GRB signal or an NTSC (National Television System Committee) signal.

The map memory 203 is constructed by a large-capacity storage medium such as CD-ROM, DVD-ROM or IC card. Map mesh data or the like necessary for display of a map is stored in the map memory 203.

A voice input/output unit 204 performs a processing for outputting a message for the user generated by the operational processor 201 in a form converted into an audio signal and a processing for recognizing a voice issued by the user and transferring the contents thereof to the operational processor 201.

An input unit 205 is a unit for receiving an instruction from the user. The input unit 205 is constructed by a hardware switch such as scroll key or scale change key, a joy stick, a touch panel applied on a display, or the like.

The sensors used for position detection in the moving body navigation device include a wheel speed sensor 206 for measuring a distance from the product of the circumference of a wheel and the measured rotating speed of the wheel and further measuring the curving angle of the moving body from a difference between the rotating speeds of paired wheels, a geomagnetic sensor 207 for detecting a magnetic field held by the earth to detect an azimuth to which the moving body points, a gyro 208 such as optical fiber gyro or vibrating gyro for detecting an angle by which the moving body turns, and a GPS receiver 209 for measuring the present position, progressing speed and progressing azimuth of the moving body by receiving a signal from a GPS satellite to measure a distance between the moving body and the GPS satellite and the rate of change in distance in connection with three or more satellites. The GPS receiver 209 can obtain time information and date information by analyzing signals sent from the GPS satellites.

Further, there is provided a traffic information receiver 210 for receiving a signal from a beacon transmitter or FM multiplex broadcasting which issues traffic information including traffic jam information of roads, regulation information such as construction and no-thoroughfare, and parking place information.

Various information in the vehicle, for example, information of peripheral vehicles sent from the follow-up target vehicle determining device 110, door open/close information, the kinds and conditions of lighted lumps, the conditions of the engine, failure diagnosis results, and so forth are transmitted to the navigation device through an in-vehicle LAN unit 211.

Figure 9:
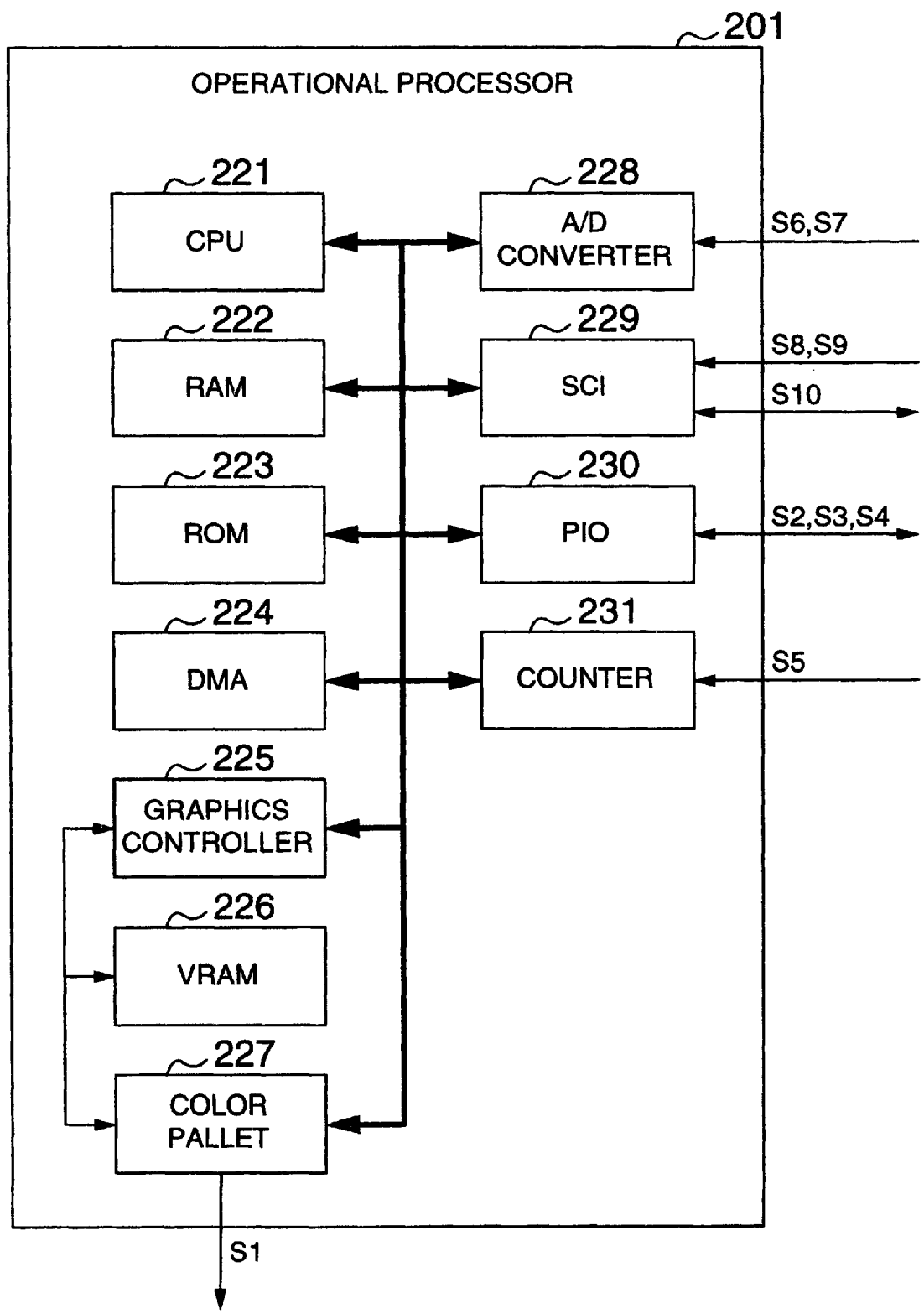
FIG. 9 is a block diagram showing the hardware construction of a n operational processor shown in FIG. 8.

FIG. 9 is a diagram for explaining the hardware construction of the operational processor 201. Each constituent element will now be described.

The operational processor 201 is constructed by devices 221 to 231 which are connected by a bus. The constituent elements include a CPU 221 for performing various processings such as numerical operation and the control of each device, a RAM 222 for storing maps, search data and operation data, a ROM 223 for storing processing programs and data, a DMA (Direct Memory Access) 224 for performing the transfer of data between the memories and between the memory and each device at a high speed, a graphics controller 225 for performing a high-speed graphics drawing for development of vector data to pixel data and a display control, a VRAM 226 for storing graphics image data, a color pallet 227 for converting image data formed by an ID code of each color into a luminance information signal of RGB, an A/D converter 228 for converting an analog signal into a digital signal, an SCI 229 for converting a serial signal into a parallel signal synchronous with the bus, a PIO 230 for carrying the parallel signal onto the bus in a synchronized manner, and a counter 231 for integrating a pulse signal.

Figure 10:
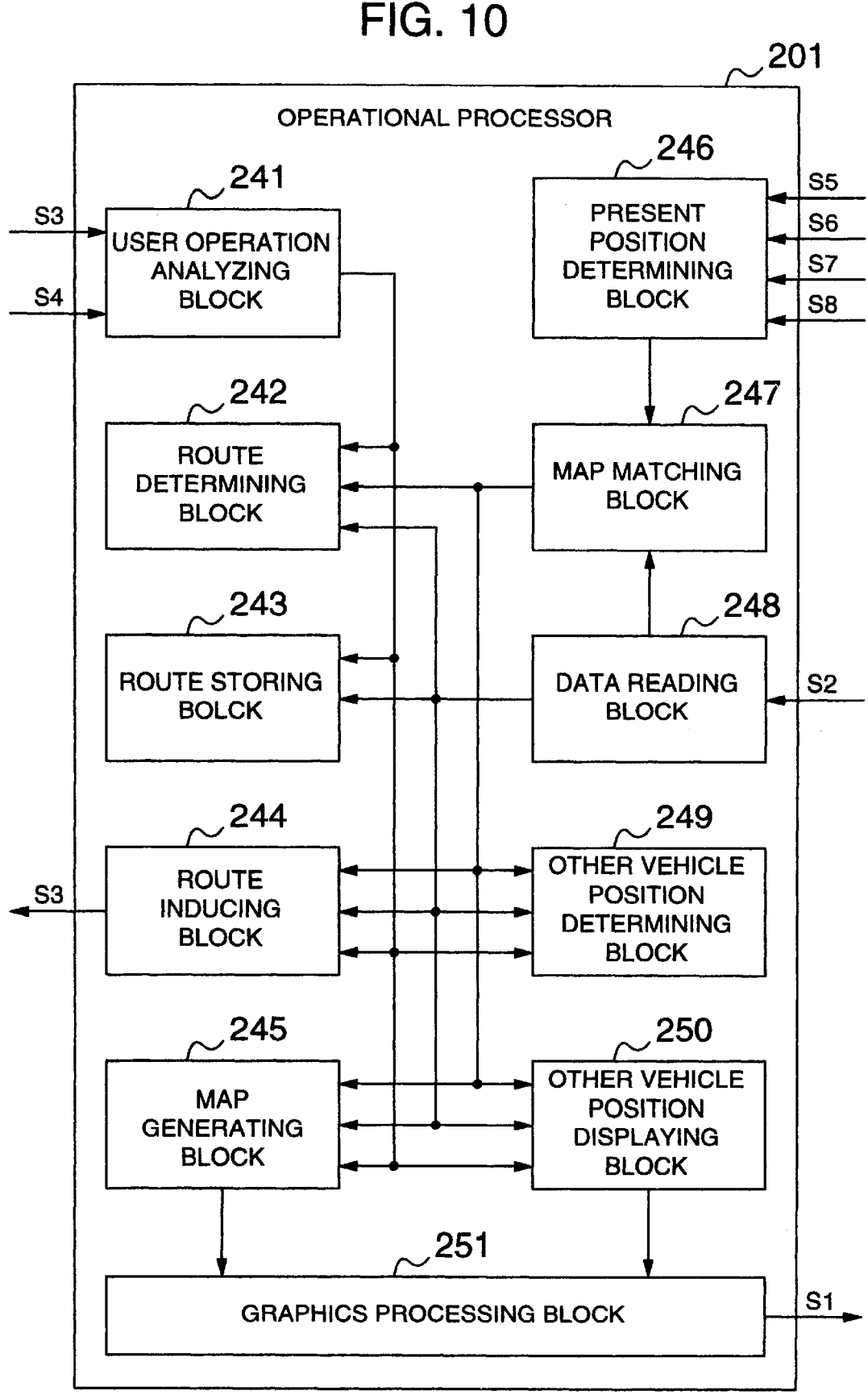
FIG. 10 is a block diagram showing the functional construction of the operational processor.

FIG. 10 is a block diagram for explaining the functional construction of the operational processor 201. Each constituent element will now be described.

A present position determining block 246 performs a processing for determining the position (X', Y') of the moving body after running from an initial position (X, Y) in such a manner that using angle data obtained as the result of integration of each of distance pulse data S5 measured by the wheel speed sensor 206 and angular acceleration data S7 measured by the gyro 208, the obtained data is integrated with respect to a time axis. In order to provide a matched relationship between the turning angle of the moving body and the progressing azimuth thereof, azimuth data S6 obtained from the geomagnetic sensor 207 and angle data obtained by integrating the angular acceleration data S7 obtained from the gyro 208 are mapped in a one-to-one correspondence relationship to correct the absolute azimuth of the moving body in a progressing direction thereof. Also, the integration of data obtained from the sensor yields the accumulation of an error of the sensor. Therefore, information of the present position is outputted through a processing for cancelling the accumulated error on the basis of position data S8 obtained from the GPS receiver 209 at a certain period.

Since sensor error is included in the present position information obtained by the present position determining block 246, a map matching block 247 performs a map match processing for the purpose of improving the precision of position information, that is, a processing in which road data included in a map around the present place read by a data reading block 248 is collated with a running locus obtained from the present position determining block 246 so that the present place is matched with a road having the highest correlation in form. With the map match processing, the present place coincides with the running road in many cases, thereby making it possible to output the present position information at a high precision. The map matching block 247 transfers the correlated road information to an other vehicle position displaying block 250.

A user operation analyzing block 241 receives a request from the user by the voice input/output device 204 or the input unit 205, analyzes the contents of the user's request (S3 or S4) and controls each block so that a corresponding processing is performed. For example, when the user makes a request for the induction from the present place to a destination via a plurality of predetermined passing-through places, the user operation analyzing block 241 requests a map generating block 245 to perform a processing for displaying a map in order to display the destination and the passing-through places. Also, the user operation analyzing block 241 requests a route determining block 242 to perform a processing for determining a route from the present place to the destination through the passing-through places. Further, the user operation analyzing block 241 provides a selecting screen to the user for selecting map attributes to be displayed in a manner superimposed on the running road, and transfers the result of selection to the other vehicle position displaying block 250.

The route determining block 242 searches map data for links/nodes from the present place toward the destination via the passing-through places by use of a Dykistra method or the like, and stores a route obtained as the result of search into a route storing block 243. By changing the weighting of the node, it is possible to determine a route with which a distance between two points becomes the shortest, a route with which the arrival is possible in the shortest time, a route with which the cost becomes the lowest, or the like.

A route inducing block 244 compares node information of an inducing route stored in the route storing block 243 with present position information determined by the present position determining block 246 and the map matching block 247 to inform the user, by use of a voice through the voice input/output unit 204 before the passing through a crossing, of whether the vehicle should go straight ahead or should make right/left turn or the like or to inform the user of a route by instructing the map generating block 245 and the other vehicle position displaying block 250 to display an inducing arrow in a manner superimposed on road form information including a crossing to which the user's vehicle should be induced.

An other vehicle position determining block 249 determines the absolute position of the peripheral vehicle from that information of a relative distance between the peripheral vehicle and the user's vehicle and the direction to the peripheral vehicle which are transferred through the in-vehicle LAN unit 211 from the distance measuring device 101 and the image pickup device 102 and that information of the absolute position of the user's vehicle which is outputted by the map matching block 247. The absolute position of the peripheral vehicle can easily be determined from the absolute position of the present place and information of a vector to the peripheral vehicle.

The map generating block 245 performs its operation in which map data of the vicinity of a point requested for the display thereof is read from the data reading block 248 and a command for drawing a designated object at a designated scale and in accordance with a designated drawing system is transferred to a graphics processing block 251.

The other vehicle position displaying block 250 operates so that it selects information of roads connecting to the running road from data of roads around the present place read by the data reading block 248 by use of running road information outputted by the map matching block 247 and develops the selected road information to a drawing command. Further, the other vehicle position displaying block 250 operates so that it develops a command for drawing marks indicative of the absolute position of the user's vehicle, the absolute position of a preceding vehicle as the object of follow-up running and the absolute position of a peripheral vehicle existing around the user's vehicle in a manner superimposed on the running road. The command is transferred to the graphics processing block 251. In the case where the vehicle selector 111 of the follow-up target vehicle determining device 110 determines the preceding vehicle so that a cruise control is started, the navigation device receives the start signal and operates to change the display screen to a mode in which the absolute position of the user's vehicle and the absolute position of the preceding vehicle as the object of follow-up running are displayed in a manner superimposed on the running road form outputted by the other vehicle position displaying block 250. Thereby, the position information of the preceding vehicle as the object of follow-up running is displayed while the cruise control is being made. Therefore, it is possible for the user to know that the follow-up control is effected.

When the drawing commands generated by the map generating block 245 and the other vehicle position displaying block 250 are received, the graphics processing block 251 develops image data to the VRAM 226.

Figure 11:
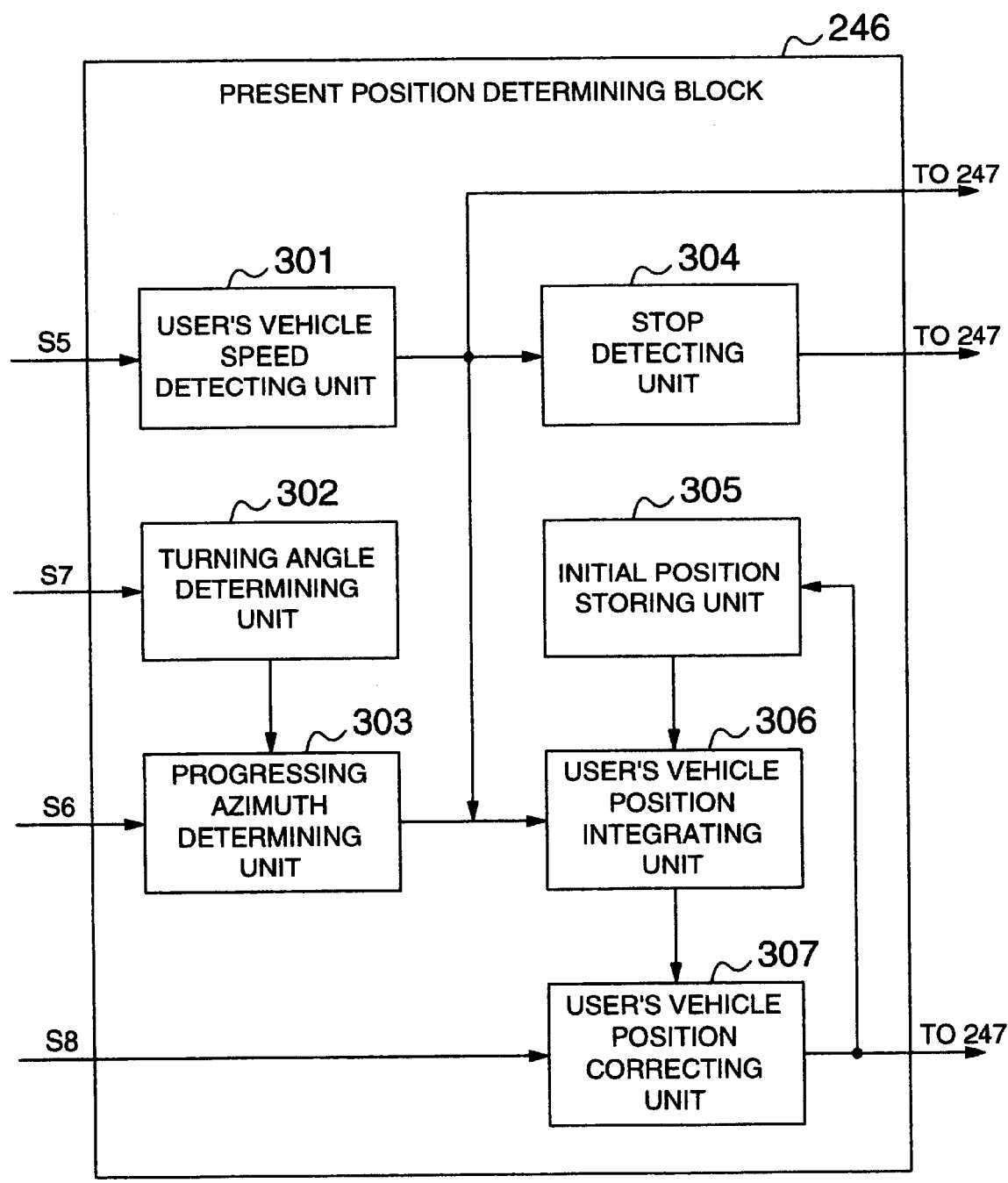
FIG. 11 is a block diagram showing the functional construction of a present position determining block shown in FIG. 10.

FIG. 11 is a diagram for explaining the functional construction of the present position determining block 246. Each constituent element will now be described.

A user's vehicle speed detecting unit 301 receives a wheel rotation pulse signal S5 from the wheel speed sensor 206 to determine the running speed of the user's vehicle from the number of pulses received within one unit time and to determine the running distance of the user's vehicle by multiplying the number of rotation pulses received within one unit time by a running distance corresponding to one pulse.

A stop detecting unit 304 monitors the running speed outputted from the user's vehicle speed detecting unit 301 to judge whether or not the running speed is 0 km/h or lower than a predetermined speed. The stop detecting unit 304 informs the map generating block 245 and the other vehicle position displaying block 250 through the map matching block 247 of a stop signal in the case where the running speed is 0 km/h and a low-speed running signal in the case where the running speed is lower than the predetermined speed. The stop detecting unit 304 may inform the map generating block 245 and the other vehicle position displaying block 250 through the map matching block 247 of the running speed of the user's vehicle.

A turning angle determining unit 302 receives a signal S7 from the gyro 208 such as an optical fiber gyro or a vibrating gyro for detection of a turning angle to determine an angle by which the user's vehicle turns per one unit time.

A progressing azimuth determining unit 303 determines the progressing azimuth of the user's vehicle by adding the turning angle determined by the turning angle determining unit 302 to azimuth information obtained in the preceding operation. An,initial value of the azimuth information herein used may be azimuth information stored in a non-volatile memory before the cut-off of a power supply. Further, the obtained azimuth information is corrected through comparison with azimuth information S6 obtained from the geomagnetic sensor 207. The azimuth information thus corrected or azimuth information corrected by the map matching block 247 is used to make the correction of internally used azimuth information at any time, thereby maintaining the precision.

A user's vehicle position integrating unit 306 determines the present position through an operation in which a progressing azimuth vector given by a progressing distance of the user's vehicle per one unit time and azimuth information is added to position information obtained from an initial position storing unit 305 and the value of addition is integrated.

A user's vehicle position correcting unit 307 compares absolute position information S8 obtained from the GPS receiver 209 and position information obtained by the user's vehicle position integrating unit 306. In the case where a difference between both the position information is within a predetermined distance, the position information from the user's vehicle position integrating unit 306 is outputted from the user's vehicle position correcting unit 307 to the map matching block 247. In the case where the difference is larger than the predetermined distance beyond a predetermined time, the absolute position information from the GPS receiver 209 is outputted to the map matching block 247. At the same time, the position information is stored into the initial position storing unit 305 and is in turn used for operation in the user's vehicle position integrating unit 306.

Figure 12:
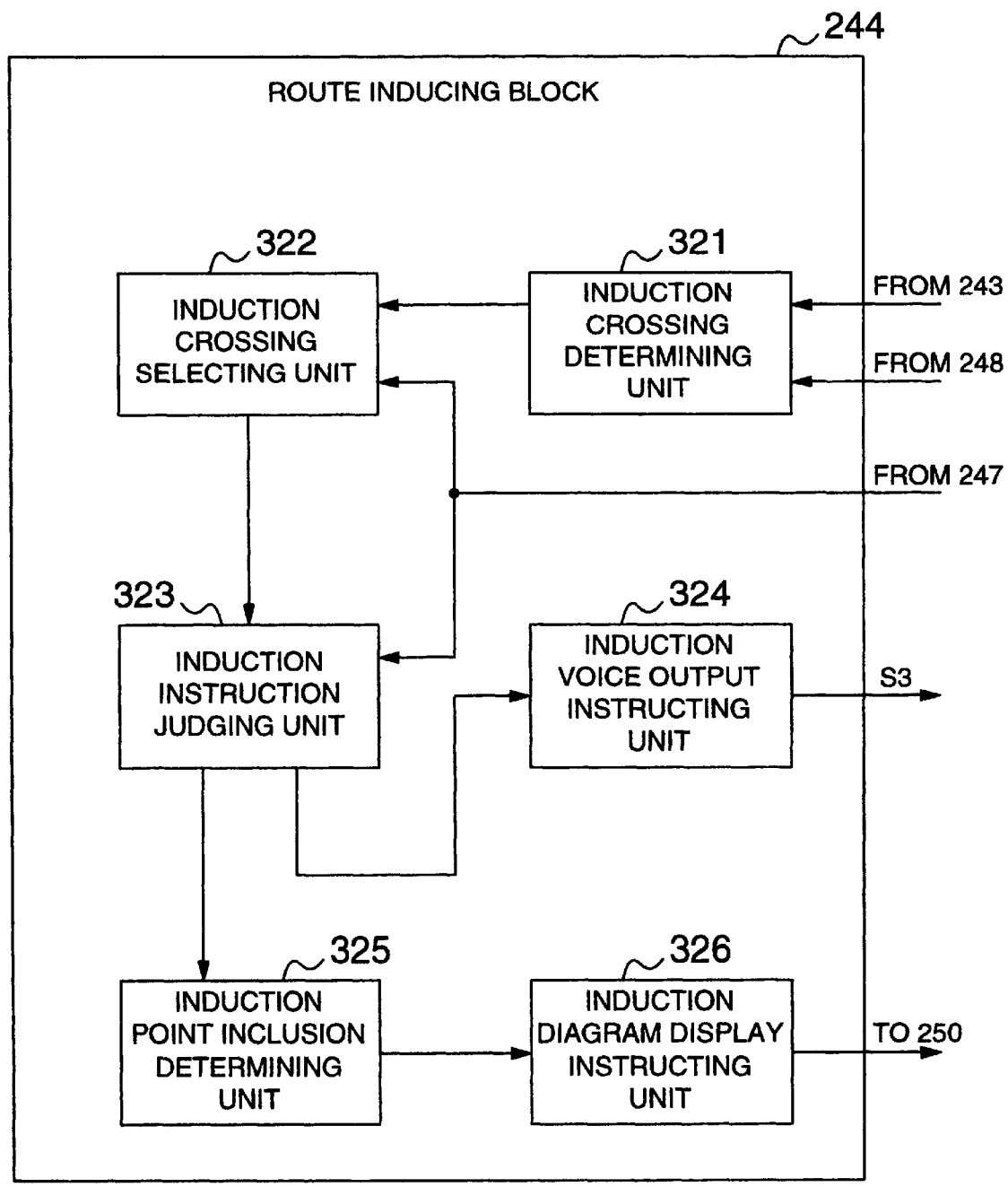
FIG. 12 is a block diagram showing the functional construction of a route inducing block shown in FIG. 10.

FIG. 12 is a diagram for explaining the functional construction of the route inducing block 244. Each constituent element will now be described.

An induction crossing determining unit 321 reads node/link data of an inducting route from the present place to a destination via passing-through places from the route storing block 243 and reads map data from the data reading block 248. Further, the induction crossing determining unit 321 refers to the map data to search for whether or not each node forming the inducting route forms a crossing. When two links intersect at a certain node, the node is judged as being a bend of a road. When three or more links intersect at a node, the node is judged as being a crossing. In the case where the judgement as being a crossing is made, an angle formed between links connecting with a node forming the crossing in the inducting route is checked in order to judge whether or not a right/left turn should be made at that node. For a side having an angle smaller than 180 degrees, the judgement is made as to whether or not the angle is smaller than a predetermined value. The predetermined value for judgement may be about 120 degrees. In the case where it is determined that the angle is smaller than the predetermined value, the corresponding crossing is an induction crossing at which a right/left turn should be made. Therefore, the corresponding node is registered as an induction crossing.

An induction crossing selecting unit 322 searches for induction crossings which exist within a predetermined distance from the present position. Accordingly, one or plural induction crossings existing within the predetermined distance from the present position are selected.

An induction instruction judging unit 323 gives an instruction for operation to an induction voice output instructing unit 324 or an induction point inclusion judging unit 325 and an induction diagram display instructing unit 326 in accordance with an inducing method set by the user and analyzed by the user operation analyzing block 241. For example, in the case where induction by voice is turned on, the instruction for operation is given to the induction voice output instructing unit 324. In the case where the display of an induction diagram is turned on, the instruction for operation is given to the induction diagram display instructing unit 326.

The induction voice output instructing unit 324 instructs the voice input/output unit 204 to output an inducing voice at a point of time when a distance between an induction crossing and the user's vehicle becomes a preset distance. For example, in the case where the preset distance is 100 m, the voice input/output unit 204 is instructed, at the point of time corresponding to that distance, to output an inducing voice of, for example, "please left-turn 100 m ahead".

The induction point inclusion judging unit 325 judges whether or not a distance between an induction crossing and the position of the user's vehicle comes to a preset distance, and informs the induction diagram display instructing unit 326 of the arrival at the induction crossing at a point of time when the preset distance is reached. Also, the induction point inclusion judging unit 325 detects the running of the user's vehicle away from the induction crossing beyond a predetermined distance and informs the induction diagram display instructing unit 326 of that effect. When informed of the arrival at the induction crossing, the induction diagram display instructing unit 326 instructs the other vehicle position displaying block 250 to display an induction diagram. On the other hand, when informed of the effect that the user's vehicle gets away from the induction crossing, the induction diagram display instructing unit 326 instructs the other vehicle position displaying block 250 to stop the display of the induction diagram. Thereby, it is possible to display induction information when the user's vehicle reaches a position on the inducting route which is before the induction crossing by the preset distance.

Figure 13:
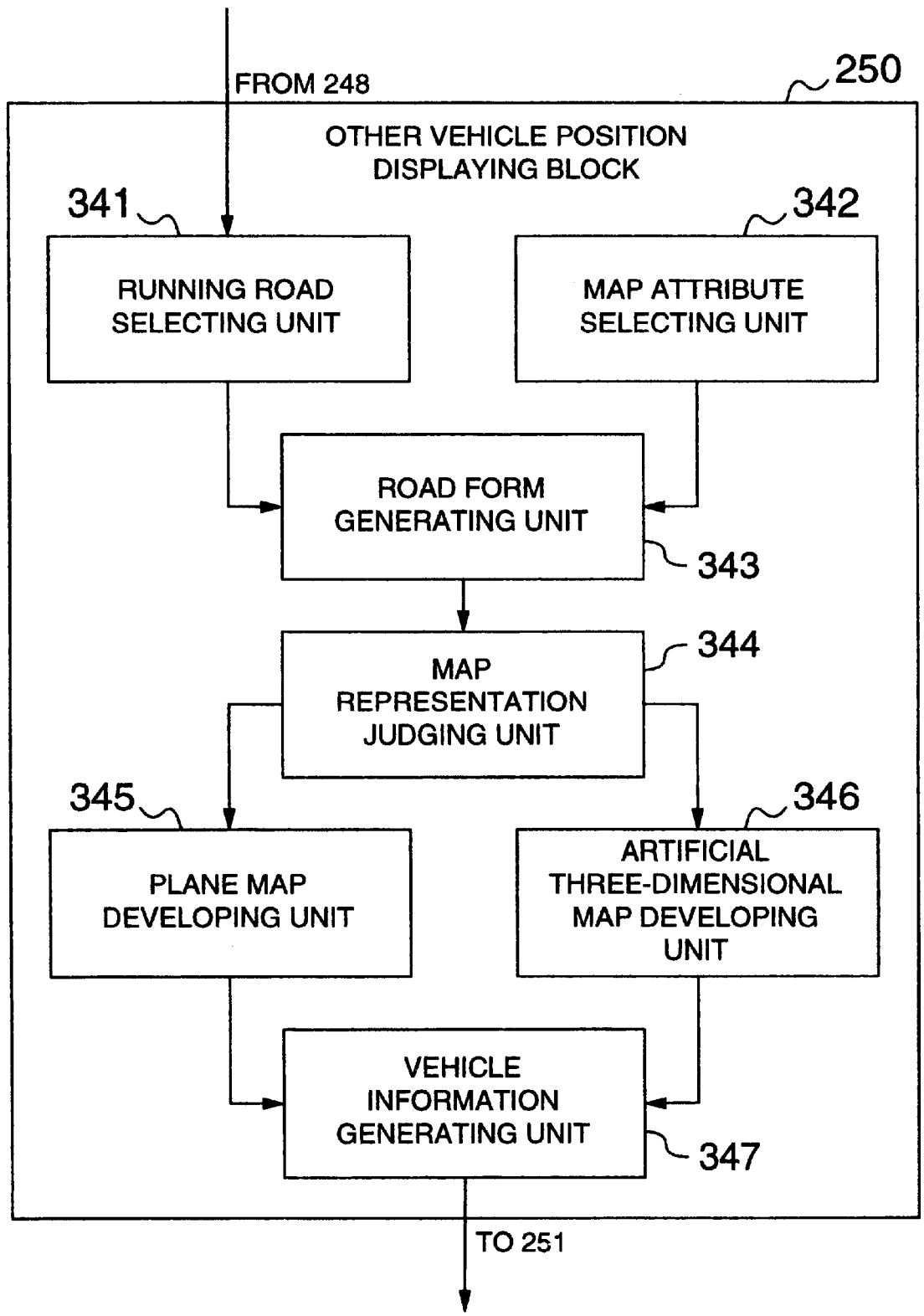
FIG. 13 is a block diagram showing a first example of the functional construction of an other vehicle position displaying block shown in FIG. 10.

FIG. 13 is a diagram for explaining a first example of the functional construction of the other vehicle position displaying block 250. Each constituent element will now be described.

Figure 16:
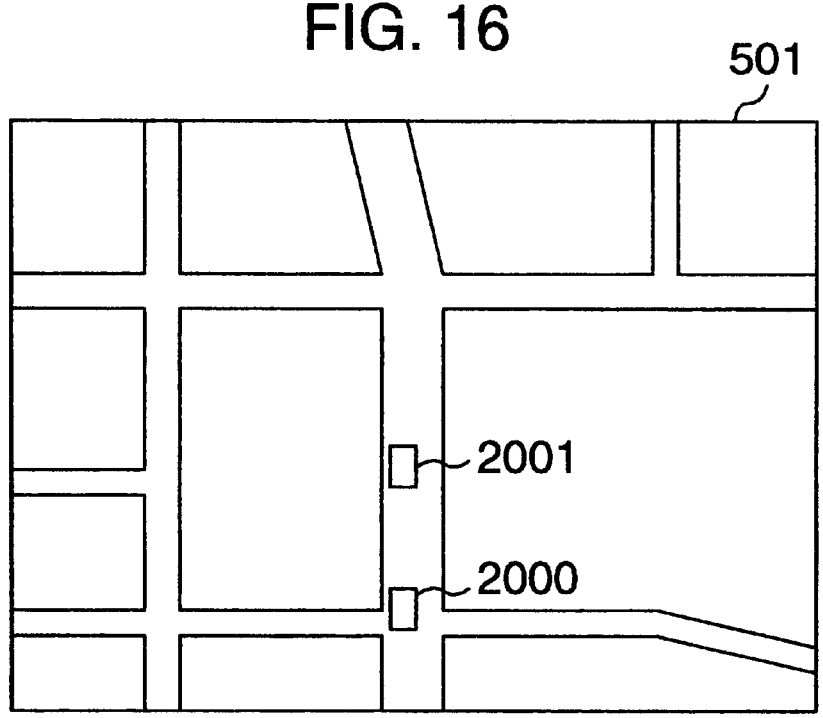
FIG. 16 is a diagram showing an embodiment in which roads around a user's vehicle are displayed.
Figure 17:
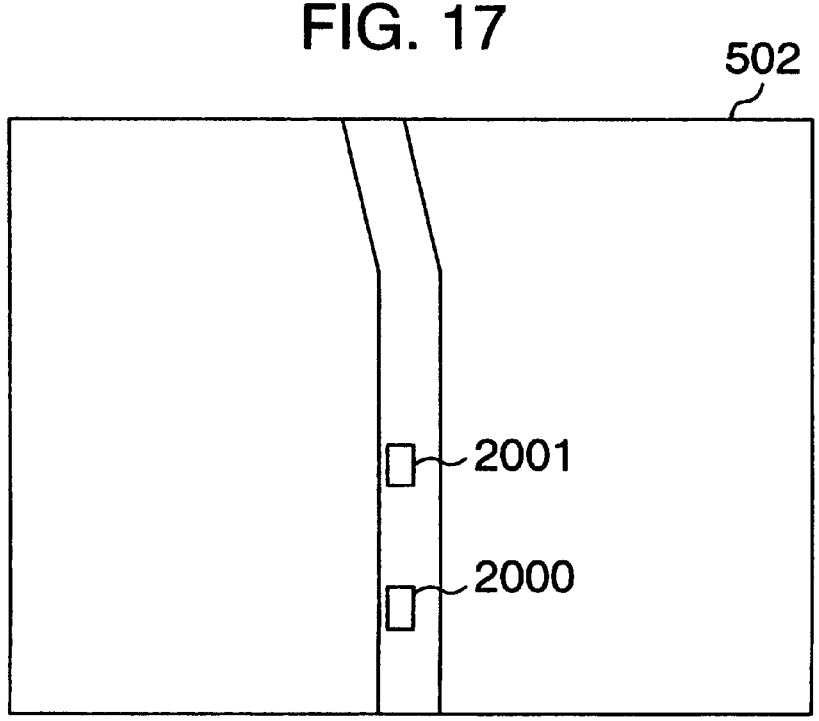
FIG. 17 is a diagram showing an embodiment in which a road under running of a user's vehicle is displayed.

The map matching block 247 selects a road matching with the running locus and gives notice of information of the selected road in a format including a mesh number of a map in which the selected road is included, and a road link number or a node number. With this information used, a running road link connecting with a road link under running of the user's vehicle is selected by a running road selecting unit 341 from the road information outputted by the map matching 247 and map information read by the data reading block 248 in order to select a road on which the user's vehicle has run and a road having a high possibility that the user's vehicle will run on that road. In selecting the road link connecting with the road link under running, the running road selecting unit 341 operates to select data of the same type of road in substance. In the case where the same type of road forks into three or more branches at the same node, road data matching in road name (such as 1st national road, 25th prefectural road or Miura highway) with the road under running may be selected. Further, a road near to straight advance may be selected from among similar branches. Also, the running road selecting unit 341 may operate to select a road link corresponding to a road included in map data in which data of the road under running is included and which has a large map scale and a coarse data density. Thereby, it becomes possible to reduce information other than the running road, which is effective for simplification of the display of a road form. Further, in the case where the user's vehicle is running on a highway or an access road connecting with a parking area or an interchange from the highway, the running road selecting unit 341 operates to select the highway under running and the access road connecting with the highway from the road data. Thereby, any road other than the above-mentioned road information is neither selected nor displayed at the time of running on the highway or the access road, which is effective for simplification of the display of a road form. Further, in the case where route induction is set, a road along an inducting road is selected. With the above processing, only information of the form of a road under running is selected. Therefore, the running road form becomes obvious at a glance, as shown in FIG. 17, thereby improving the driver's understandability. Now consider that the case where roads around the user's vehicle and background information are all displayed without using the above-mentioned running road selecting unit. In this case, if the user's vehicle is moving at a high speed, a display image as shown in FIG. 16 assumes a moving picture since the positions of roads perpendicularly intersecting with the running road have a large change. This results in the elongation of a time until the understanding by the user and hence the deterioration of safety. On the other hand, with the use of the above-mentioned running road selecting unit, the display is restricted to only the road under running of the user's vehicle, as shown in FIG. 17. In this case, the display image assumes display close to a still picture, thereby improving the safety. There is a possibility that the position of the user's vehicle cannot be specified in a fixed time after the navigation device starts its operation. In such a case, the running road selecting unit 341 operates to generate a virtual straight road which has a predetermined road width. At this time, there may be the case where the form of the generated road is different from the actual road form. At any time, however, the running road selecting unit 341 operates so that road form information is outputted. Therefore, it is possible to eliminate a state in which a road form cannot be displayed.

A map attribute selecting unit 342 operates to select information which is to be displayed in a superimposed manner in addition to the running road of the user's vehicle selected by the running road selecting unit 341. The map attribute selecting unit 342 has a function of selecting background information such as water systems and green zones, character information such as place names, and marks or deform symbols such as public services and amusement places in accordance with the running condition of the user's vehicle and the operating condition of the navigation device. The detailed operation of the map attribute selecting unit 342 will be described later on.

A road form generating unit 343 generates a road form on the basis of road data selected by the running road selecting unit 341 and the map attribute selecting unit 342. A format of map data used for generating the road form is broadly classified into first data or road data which is formed by node information and link information when a road is represented by one vector data along the center of that road, and second data or residential area map data which includes a road outline form stored with node information. When one road is represented, a straight line connecting nodes assumes one broken line in the case of road data and two broken lines in the case of residential area map data.

Figure 18:
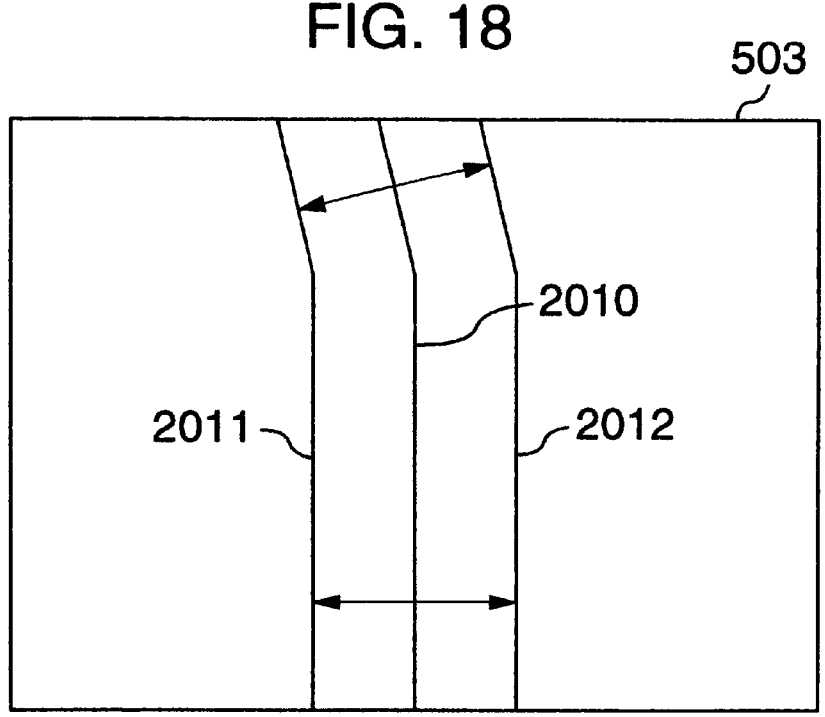
FIG. 18 is a diagram for explaining a method of generating a road form.

Next, a method of generating a road form from the road data will be described using FIG. 18. Since an actual road has a width, it is necessary to generate right and left road outlines 2012 and 2011 from one broken line 2010 which connects nodes. Herein, in the case where width information or the like concerning a road under running does not exist in a storage medium of the map memory 203, outlines corresponding to a road width obtained as the result of imaging of the road by the image pickup device 102 are generated by generating broken lines through the parallel movement of the road form forming broken line 2010 in directions perpendicular to the broken line 2010 by a quantity corresponding to a predetermined road width. Also, in the case where only road type information of the road under running exists in the storage medium of the map memory 203, outlines having a predetermined road width corresponding to the road type of the running road are generated by generating broken lines through the parallel movement of the road form forming broken line 2010 in directions perpendicular to the broken line 2010 by a quantity corresponding to a predetermined road width. Further, in the case where the width of the running road is stored in the storage medium of the map memory 203, outlines having a road width corresponding to the width of the running road are generated by generating broken lines through the parallel movement of the road form forming broken line 2010 in directions perpendicular to the broken line 2010 by a quantity corresponding to a predetermined road width. Thereby, it is possible to generate a road form conformable to the actual form. Also, in the case where the number of lanes of the running road is stored in the storage medium of the map memory 203, outlines having a road width corresponding to the number of lanes are generated by generating broken lines through the parallel movement of the road form forming broken line 2010 in directions perpendicular to the broken line 2010 by a quantity corresponding to a predetermined number of lanes. Thereby, it is possible to generate a road form conformable to the actual form. Further, outlines representing the lanes may be generated.

Figure 19:
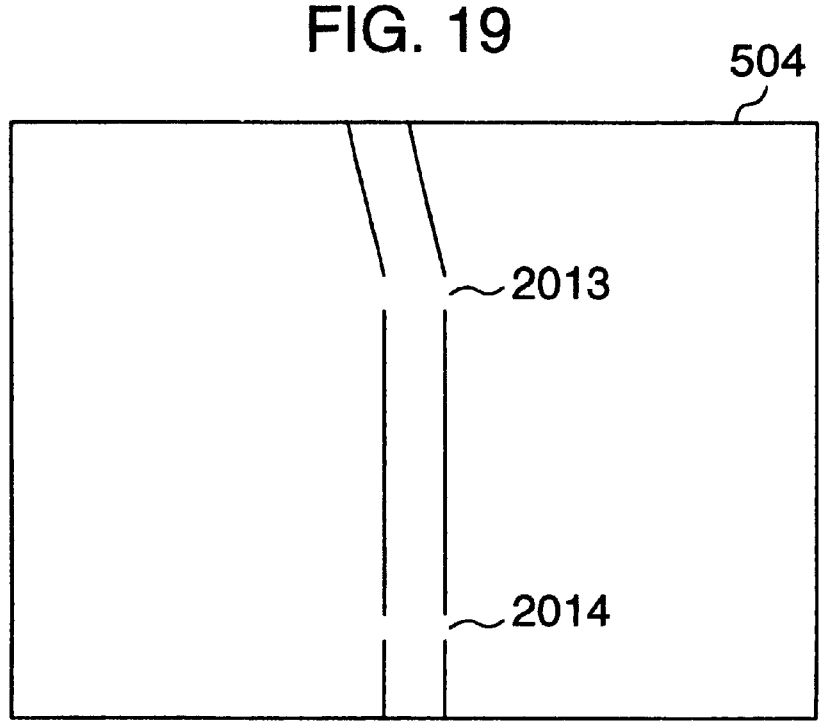
FIG. 19 is a diagram for explaining a method of generating a road form from residential area map data.

Next, a method of generating a road form from the residential area map data will be described. The residential area map data is formed beforehand by form information of road outlines as shown in FIG. 16. Therefore, if only a road under running is selected, there results in that disconnections 2013 and 2014 as shown in FIG. 19 are generated. Accordingly, a straight line connecting the front and rear ends of the disconnection is generated, thereby enabling the generation of a road form as shown in FIG. 17.

A map representation judging unit 344 judges which representing manner should road information or the like generated the road form generating unit 343 be displayed on the display unit in. In the case where the user makes a request for plane view representation, that is, representation equivalent to a paper map, the map representation judging unit 344 requests a plane map developing unit 345 to effect display in plane view representation. On the other hand, in the case where the user makes a request for birds-eye view representation, the map representation judging unit 344 sets a point-of-sight position to a rear position from which the present position of the user's vehicle is overlooked and requests an artificial three-dimensional map developing unit 346 to effect display in birds-eye view representation.

The plane map developing unit 345 and the artificial three-dimensional map developing unit 346 make the coordinate conversion of map data or vector data representative of form information of road outlines so that in the case of plane map representation, the position of the user's vehicle is located at a predetermined position on the display unit at a predetermined scale and the progressing azimuth of the user's vehicle assumes an upward direction on the display unit and so that in the case of an artificial three-dimensional map or a three-dimensional map, the position of the user's vehicle and the position of a peripheral vehicle are overlooked at a predetermined scale from a given point-of-sight position. Further, the plane map developing unit 345 or the artificial three-dimensional map developing unit 346 uses the coordinate-converted vector data to generate a command drawing a series of lines representing the road outlines and transfers the graphics drawing command to the graphics processing block 251 to effect the drawing so that a plane view or birds-eye view is displayed on the display unit 115.

Figure 22:
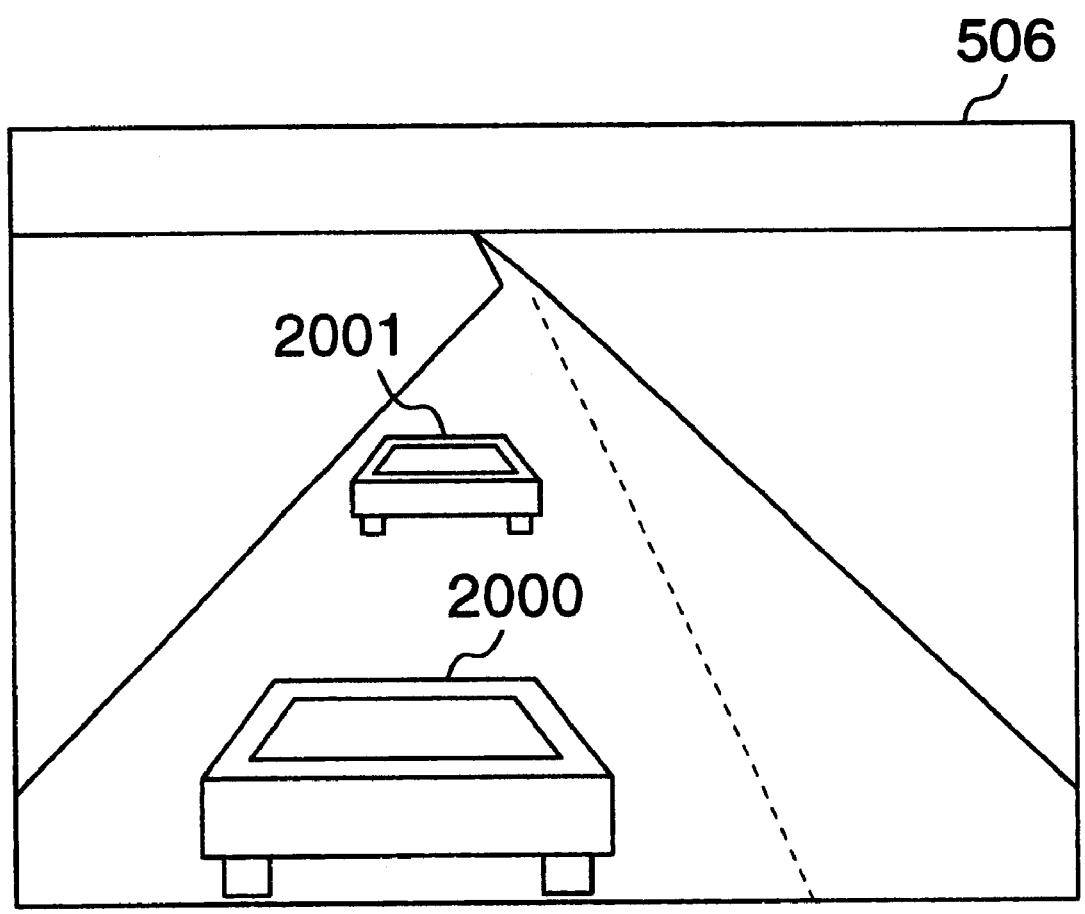
FIG. 22 is a diagram showing an embodiment in which a road under running of a user's vehicle is displayed in birds-eye view representation.

A vehicle information generating unit 347 make the coordinate conversion of the position of the user's vehicle obtained by the map matching block 247 and the position of a preceding vehicle and the position of a peripheral vehicle obtained by the other vehicle position determining block 249 in a manner similar to the above-mentioned coordinate conversion, generates a command for drawing marks indicative of the positions of those vehicles and transfers the graphics drawing command to the graphics processing block 251 to effect the drawing so that the position of the user's vehicle, the position of the preceding vehicle and the position of the peripheral vehicle are displayed on the display unit 115 in a manner superimposed on the plane view or birds-eye view. An example of display of vehicle information superimposed on a plane view is shown FIG. 17, and an example of display of vehicle information superimposed on a birds-eye view is shown FIG. 22. It is preferable that the vehicle information generating unit 347 judges the display/non-display of vehicle position information in accordance with the scale of a road to be displayed and makes the switching of display/non-display on the basis of the result of judgement. Namely, the vehicle information generating unit 347 operates to display vehicle information when the scale is smaller than a predetermined scale (for example, 1/2500 or 1/5000 with which a town map can be displayed) and to display no vehicle information when it is larger than the predetermined scale. Thereby, since the vehicle information generating unit 347 operates so that vehicle position information is not generated when the reduction is made up to an extension in which the vehicle information cannot be discriminated even if it is displayed, a processing load becomes small.

Figure 14:
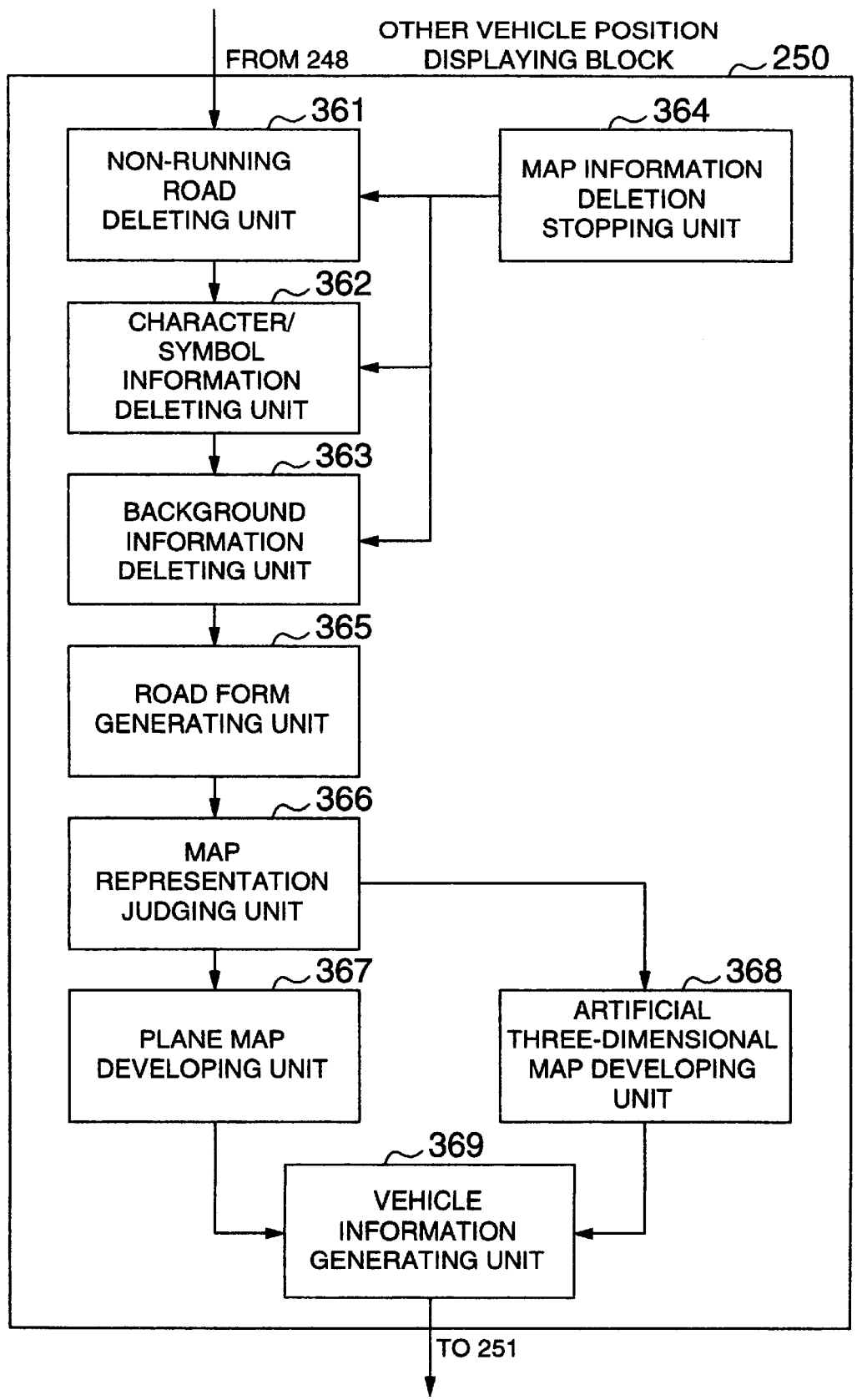
FIG. 14 is a block diagram showing a second example of the functional construction of the other vehicle position displaying block.

FIG. 14 is a diagram for explaining a second example of the functional construction of the other vehicle position displaying block 250. Each constituent elements will now be described.

A non-running road deleting unit 361 operates, in connection with map information read by the data reading block 248 from the map information storage medium, to delete unnecessary road data from the read road information. More particularly, the non-running road deleting unit 361 operates to delete roads other than a road under running of the user's vehicle and a road of a road type the deletion of which is inhibited by a map information deletion stopping unit 364. In substance, the road under running of the user's vehicle herein referred to indicates data of a road of the same type as a road link under running. Also, in the case where the same type of road forks into three or more branches at the same node, road data matching in road name (such as 1st national road, 25th prefectural road or Miura highway) with the road under running is indicated. Further, a road near to straight advance in similar branches may be indicated. Also, in the case where the user's vehicle is running on a highway or an access road connecting with a parking area or an interchange from the highway, the highway under running and the access road connecting with the highway are indicated. With this processing, there results in that only information of the form of a road under running of the user's vehicle is displayed, as shown in FIG. 17. Therefore, the running road form becomes obvious at a glance, thereby improving the understandability. Further, the display image assumes display close to a still picture, thereby improving the safety. There is a possibility that the position of the user's vehicle cannot be specified in a fixed time after the navigation device starts its operation. In such a case, the non-running road deleting unit 361 operates to generate a virtual straight road which has a predetermined road width. At this time, there may be generated the case where the form of the generated road is different from the actual road form. At any time, however, the non-running road deleting unit 361 operates so that road form information is outputted. Therefore, it is possible to eliminate a state in which a road form cannot be displayed.

A character/symbol information deleting unit 362 operates, in connection with map information read by the data reading block 248 from the map information storage medium, so that character/symbol information other than character/symbol information the deletion of which is inhibited by the map information deletion stopping unit 364 is deleted from character information such as place names, map symbols representative of public services, deform symbols representative of restaurants and convenience stores, and so forth. The map information deletion stopping unit 364 designates, character/symbol information to be subjected to the inhibition of deletion, by virtue of the attribute, type, individual identification number and/or the like of a character/symbol. Further, the attribute, type, individual identification number and/or the like of a character/symbol to be subjected to the inhibition of deletion can be designated doubly. For example, when restaurants and place names are to be subjected to the inhibition of deletion, character/symbol information other than restaurants and place names is deleted and there results in that deform symbols representative of restaurants and character strings of place names are displayed in a manner superimposed on the map. As a result, the representation on the display screen becomes simple, thereby improving the understandability.

A background information deleting unit 363 operates, in connection with map information read by the data reading block 248 from the map information storage medium, so that background information other than background information the deletion of which is inhibited by the map information deletion stopping unit 364 is deleted from information which is to be displayed in a manner superimposed on a map in addition to road information and character/symbol information, that is, from background information which includes water system information such as rivers, lakes and seas, railway information, urban district information, greens information, and so forth. The map information deletion stopping unit 364 designates, background information to be subjected to the inhibition of deletion, by virtue of the attribute, type, individual identification number and/or the like of a background. Further, the attribute, type, individual identification number and/or the like of a background to be subjected to the inhibition of deletion can be designated doubly. For example, when water systems and railways are to be subjected to the inhibition of deletion, background information other than water systems and rail ways is deleted and there results in that broken lines and planes representative of water systems and broken lines representative of railways are displayed in a manner superimposed on the map. As a result, the representation on the display screen becomes simple, thereby improving the understandability.

In the case where the stop detecting unit 304 judges the speed of the user's vehicle as being lower than the predetermined speed, the map information deletion stopping unit 364 controls the non-running road deleting unit 361, the character/symbol information deleting unit 362 and the background information deleting unit 363 so that map attributes and road types corresponding to the running speed are not subjected to non-display. With this processing, it becomes possible to display an increased amount of map information as the speed is lowered. Further, the map information deletion stopping unit 364 controls the non-running road deleting unit 361, the character/symbol information deleting unit 362 and the background information deleting unit 363 so that map attributes designated by the user and analyzed by the user operation analyzing block 241 are not subjected to nondisplay.

A road form generating unit 365 generates a road form other than road data deleted by the non-running road deleting unit 361. A format of map data used for generating the road form is broadly classified into first data or road data which is formed by node information and link information when a road is represented by one vector data along the center of that road, and second data or residential area map data which includes a road outline form stored with node information. Accordingly, when one road is represented, a straight line connecting nodes assumes one broken line in the case of road data and two broken lines in the case of residential area map data.

First, a method of generating a road form from the road data will be described using FIG. 18. Since an actual road has a width, it is necessary to generate right and left road outlines 2012 and 2011 from one broken line 2010 which connects nodes. Herein, in the case where width information or the like concerning a road under running does not exist in a storage medium of the map memory 203, outlines corresponding to a road width obtained as the result of imaging of the road by the image pickup device 102 are generated by generating broken lines through the parallel movement of the road form forming broken line 2010 in directions perpendicular to the broken line 2010 by a quantity corresponding to a predetermined road width. Also, in the case where only road type information of the road under running exists in the storage medium of the map memory 203, outlines having a predetermined road width corresponding to the selected road type are generated by generating broken lines through the parallel movement of the road form forming broken line 2010 in directions perpendicular to the broken line 2010 by a quantity corresponding to a predetermined road width. Further, in the case where the width of the running road is stored in the storage medium of the map memory 203, outlines having a road width corresponding to the width of the running road are generated by generating broken lines through the parallel movement of the road form forming broken line 2010 in directions perpendicular to the broken line 2010 by a quantity corresponding to a predetermined road width. Thereby, it is possible to generate a road form conformable to the actual form. Also, in the case where the number of lanes of the running road is stored in the storage medium of the map memory 203, outlines having a road width corresponding to the number of lanes are generated by generating broken lines through the parallel movement of the road form forming broken line 2010 in directions perpendicular to the broken line 2010 by a quantity corresponding to a predetermined number of lanes. Thereby, it is possible to generate a road form conformable to the actual form. Further, outlines representing the lanes may be generated.

Next, a method of generating a road form from the residential area map data will be described. The residential area map data is formed beforehand by form information of road outlines as shown in FIG. 16. Therefore, if only a road under running is selected, there results in that disconnections 2013 and 2014 as shown in FIG. 19 are generated. Accordingly, a straight line connecting the front and rear ends of the disconnection is generated, thereby enabling the generation of a road form as shown in FIG. 17.

A map representation judging unit 366 judges which representing manner should road information or the like generated the road form generating unit 365 be displayed on the display unit in. In the case where the user makes a request for plane view representation, that is, representation equivalent to a paper map, the map representation judging unit 366 requests a plane map developing unit 367 to effect display in plane view representation. On the other hand, in the case where the user makes a request for birds-eye view representation, the map representation judging unit 366 sets a point-of-sight position to a rear position from which the present position of the user's vehicle is overlooked and requests an artificial three-dimensional map developing unit 368 to effect display in birds-eye view representation.

The plane map developing unit 367 and the artificial three-dimensional map developing unit 368 make the coordinate conversion of map data or vector data representative of form information of road outlines so that in the case of plane map representation, the position of the user's vehicle is located at a predetermined position on the display unit at a predetermined scale and the progressing azimuth of the user's vehicle assumes an upward direction on the display unit and so that in the case of an artificial three-dimensional map or a three-dimensional map, the position of the user's vehicle and the position of a peripheral vehicle are overlooked at a predetermined scale from a given point-of-sight position. Further, the plane map developing unit 367 or the artificial three-dimensional map developing unit 368 uses the coordinate-converted vector data to generate a command drawing a series of lines representing the road outlines and transfers the graphics drawing command to the graphics processing block 251 to effect the drawing so that a plane view or birds-eye view is displayed on the display unit 115.

A vehicle information generating unit 369 make the coordinate conversion of the position of the user's vehicle obtained by the map matching block 247 and the position of a preceding vehicle and the position of a peripheral vehicle obtained by the other vehicle position determining block 249 in a manner similar to the above-mentioned coordinate conversion, generates a command for drawing marks indicative of the positions of those vehicles and transfers the graphics drawing command to the graphics processing block 251 to effect the drawing so that the position of the user's vehicle, the position of the preceding vehicle and the position of the peripheral vehicle are displayed on the display unit 115 in a manner superimposed on the plane view or birds-eye view. An example of display of vehicle information superimposed on a plane view is shown FIG. 17, and an example of display of vehicle information superimposed on a birds-eye view is shown FIG. 22. It is preferable that the vehicle information generating unit 369 judges the display/non-display of vehicle position information in accordance with the scale of a road to be displayed and makes the switching of display/non-display on the basis of the result of judgement. Namely, the vehicle information generating unit 369 operates to display vehicle information when the scale is smaller than a predetermined scale and to display no vehicle information when it is larger than the predetermined scale. Thereby, since the vehicle information generating unit 369 operates so that vehicle position information is not generated when the reduction is made up to an extension in which the vehicle information cannot be discriminated even if it is displayed, a processing load becomes small.

Figure 15:
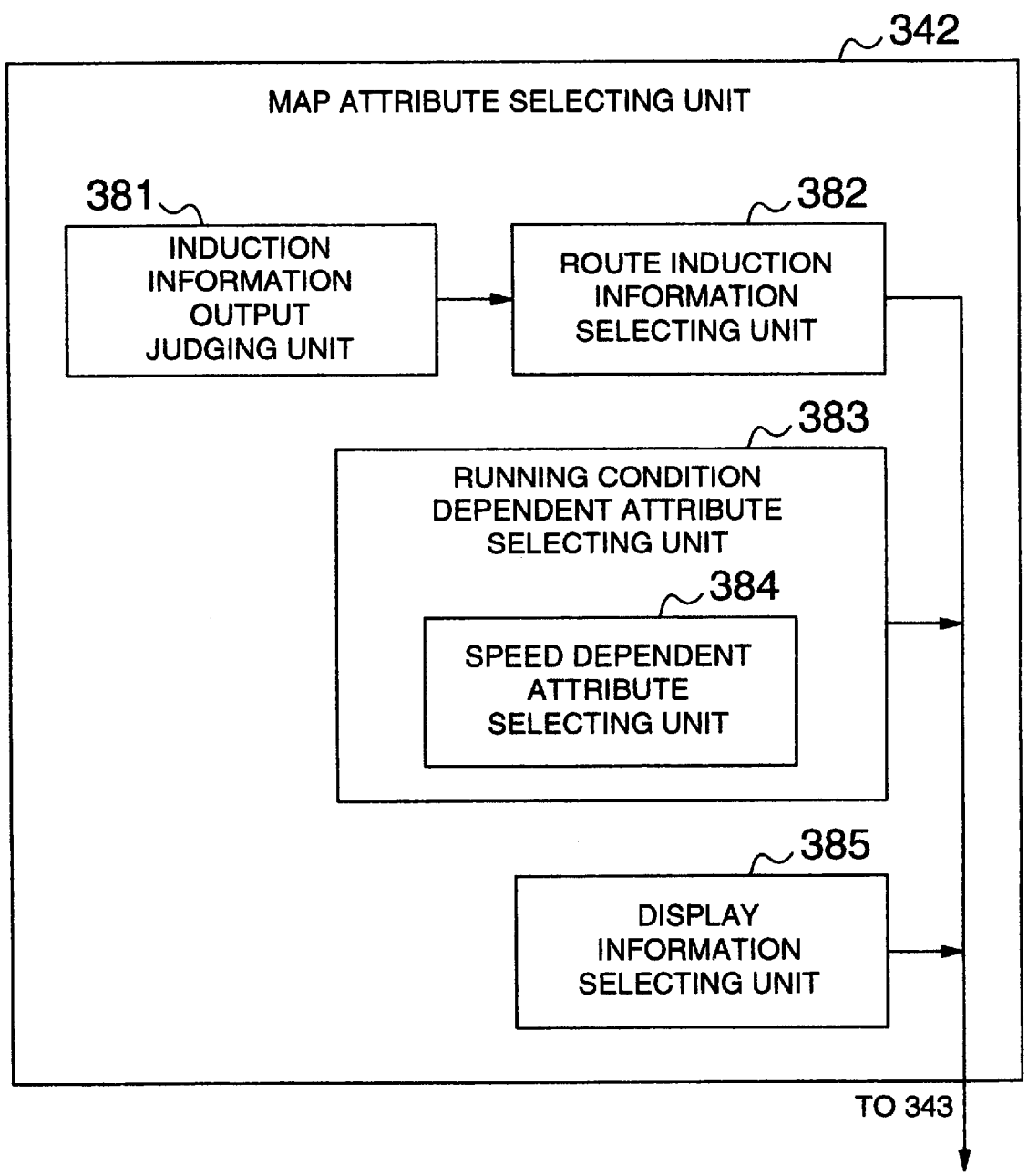
FIG. 15 is a block diagram showing the functional construction of a map attribute selecting unit shown in FIG. 13.

FIG. 15 is a diagram for explaining the functional construction of the map attribute selecting unit 342. Each constituent elements will now be described.

Figure 20:
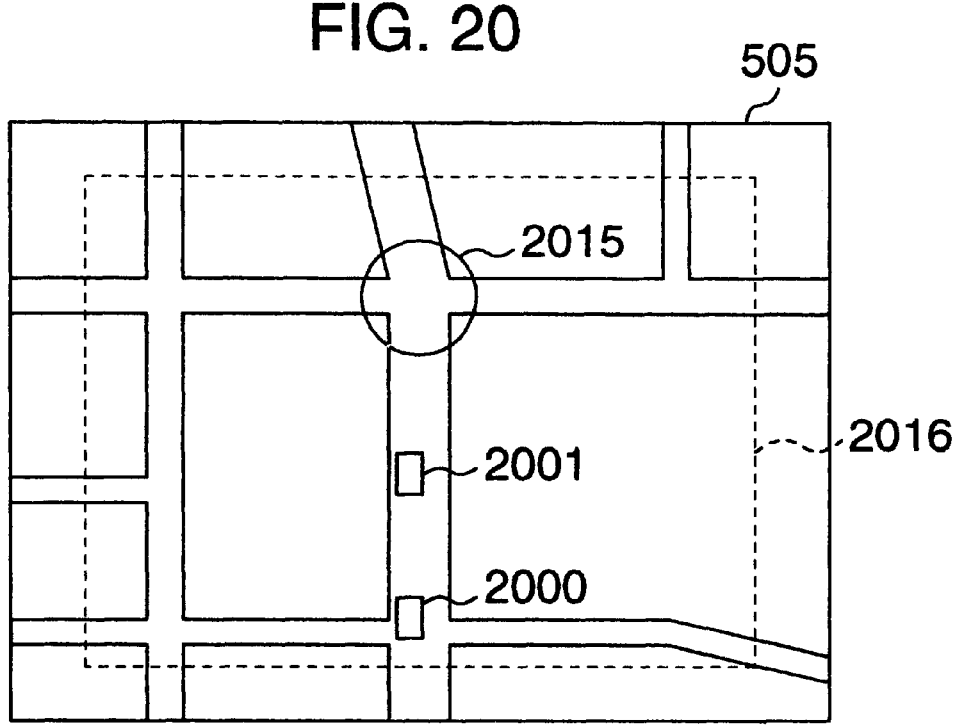
FIG. 20 is a diagram for explaining a judgement area for start of the display of an induction crossing.

An induction information output judging unit 381 makes, when a route to a destination and a route inducing function is operating, the judgement of whether or not an induction screen is to be displayed on the other vehicle position displaying block 250. The judgement is made on the basis of an induction information display timing signal sent from the induction diagram display instructing unit 326. A method for judgement includes checking whether or not an induction crossing 2015 enters a judgement area 2016 which is positioned inwards from an outer frame of the display unit by the number of pixels corresponding to a predetermined width, as shown in FIG. 20. In the case where the induction crossing enters the judgement area, the induction information output judging unit 381 operates to activate a route induction information selecting unit 382.

Figure 21:
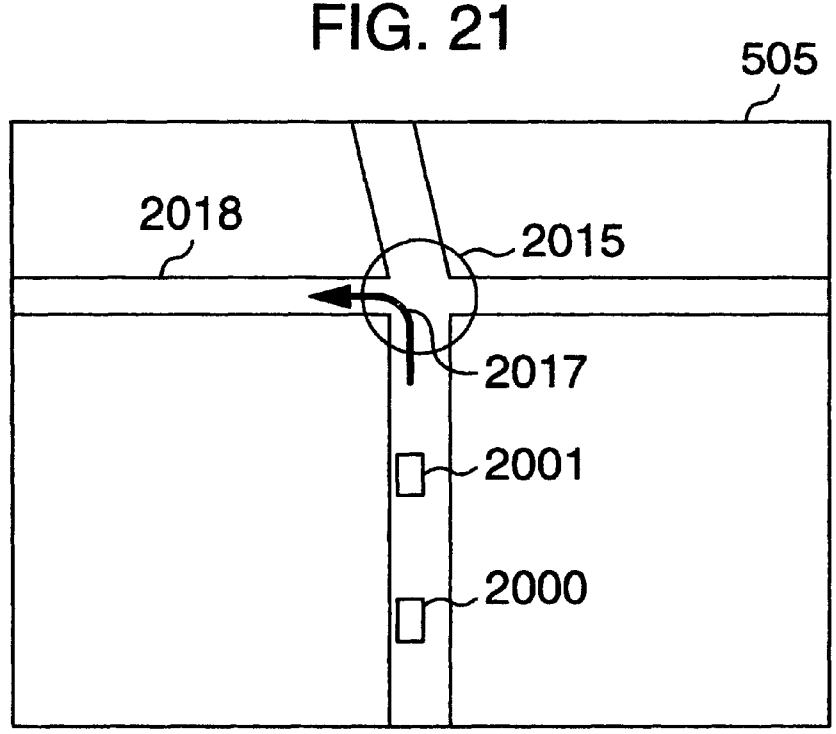
FIG. 21 is a diagram for explaining a method of selecting a road connecting with the induction crossing.

The route induction information selecting unit 382 selects a road 2018 connecting with the induction crossing 2015 from map data and generates an inducing arrow 2017 on the basis of approach information and leave information for the induction crossing. Thereby, the running road and an inducing road connecting with the induction crossing are selected from roads (see FIG. 16) around the user's vehicle and are displayed, as shown in FIG. 21. Therefore, even while the form of the running road is being displayed, route induction is continuously effected. In connection with a road connecting with the induction crossing, if the same type of road adjacent to that road is selected, the amount of information can be limited efficiently, thereby improving the understandability of the display screen. Also, after the display of the induction crossing is started, it is preferable that a change is made from a displaying method the position of the user's vehicle is fixed at one certain point on the display unit to a displaying method in which the induction crossing 2015 is fixed at one certain point on the display unit. Thereby, the displaying position of road information is fixed on the display screen while only the displaying position of vehicle position information changes every moment due to the movement of the user's vehicle 2000 and the other peripheral vehicle 2001. Therefore, the possibility of erroneous judgement of information of the induction crossing including of the position and form thereof becomes small. On the other hand, after the user's vehicle passes through the induction crossing, it is preferable to return to the displaying method the position of the user's vehicle is fixed at one certain point on the display unit. In a crossing, there is a possibility that the user's vehicle makes a large change in direction. Therefore, if the map is rotated, it is difficult to grasp the form of the crossing.

A running condition dependent attribute selecting unit 383 operates so that information to be displayed in addition to a road under running of the user's vehicle is selected in accordance with the running condition of the user's vehicle, that is, the speed, progressing direction and so forth of the user's vehicle. A speed dependent attribute selecting unit 384 for selecting information to be displayed in accordance with the speed of the user's vehicle will now be described as a typical example of the running condition dependent attribute selecting unit 383. If information including roads intersecting a road under running of the user's vehicle, roundabout ways and so forth is displayed when the user's vehicle is running at a high speed, there results in the display of a large amount of information and this provides a cause for erroneous judgement. At the time of vehicle stop or at the time of low-speed running, however, the presentation of information of roads in the neighborhood of the user's vehicle and so forth to the user or driver is effective for the driver to acquire geographical information of the neighborhood and information of roundabout ways. Accordingly, the speed dependent attribute selecting unit 384 receives information outputted from the stop detecting unit 304 about whether or not the running speed of the user's vehicle is 0 km/h or lower than a predetermined speed, and operates, when the speed is 0 km/h, to select information of all roads inclusive of the running road, or to select main roads (that is, highways, national roads, prefectural roads, and so forth) or to select road attributes set by the user and analyzed by the user operation analyzing block 241. In the case where the speed is lower than the predetermined speed (10 km/h or a speed regulated by the Motor Vehicle Industry Society), too, the speed dependent attribute selecting unit 384 performs an operation similar to that in the case where the speed is 0 km/h, that is, the speed dependent attribute selecting unit 384 selects information of all roads inclusive of the running road, selects road types corresponding to the vehicle speed or selects road attributes set by the user and analyzed by the user operation analyzing block 241. Also, the speed dependent attribute selecting unit 384 may operate to select not only road information but also character/symbol information and/or background information so that various information is provided at the time of stop when the user can afford to see the display screen. Further, a method of selecting information to be displayed in accordance with the weather condition of the vicinity of a road under running of the user's vehicle and/or the brightness of the surroundings thereof will now be described as another embodiment of the running condition dependent attribute selecting unit 383. For example, in the case where the visibility is poor owing to rainy weather, snowy weather or the like or in the case where the visibility is poor owing to night time or the like, the running condition dependent attribute selecting unit 383 operates to display a more amount of information in order to compensate for the poor visibility. Namely, at the time of poor visibility, the running condition dependent attribute selecting unit 383 operates so that in addition to road attributes, background information and character/symbol information selected at the time of normal running, information of predetermined attributes is excluded from the inhibition of display. Thereby, even when the amount of information necessary for driving is reduced owing to the deterioration of visibility, map information is displayed on the display unit, thereby improving the understandability.

A display information selecting unit 385 operates to select map attributes a request for continual display of which is made by the user through the user operation analyzing block 241. An example of selected map attributes may include point information registered by the user, parking place information, gasoline stand information, and so forth.

Map information thus selected by the route induction dependent attribute selecting unit 383 and the display attribute selecting unit 385 is developed to a drawing command by the plane map developing unit 345 or the artificial three-dimensional map developing unit 346 so that the selected map information is displayed in a manner superimposed on a running road.

According to the present invention as described above, a road form is generated from a map database possessed by a navigation device. Therefore, a vehicle provided with the navigation device operates so that cruise control information is displayed at a low cost and accurately. Further, since it can be operated so that the display is limited to the form of a road under running of a user's vehicle, a simplified display screen is provided, thereby improving the understandability by the user. Also, since the simplified display screen shortens a time required for reading information, the contribution to the improvement in safety is made.

What is claimed is:

1. A vehicle position information displaying apparatus comprising:
    map storing means for outputting map information of a predetermined area stored therein;
    means for detecting a present position of a user's vehicle;
    another vehicle detecting means for detecting a position of the another vehicle around a present position of a user's vehicle detected by said user's vehicle present position detecting means; and
    displaying means for displaying the map information outputted from said map storing means, information of the detected present position of said user's vehicle, and information of the detected position of the another vehicle in a superimposed manner on a display screen.

2. A vehicle position information displaying apparatus according to claim 1, further comprising running road selecting means for selecting road information of a running road of the user's vehicle from said map information on the basis of the present position of the user's vehicle so that the selected road information is outputted.

3. A vehicle position information displaying apparatus according to claim 2, further comprising speed detecting means for detecting the running speed of the user's vehicle, and map information deletion stopping means for stopping the operation of at least one of said running road selecting means, said non-running road deleting means, said character/symbol information deleting means and said background information deleting means when the detected running speed of the user's vehicle is lower than a predetermined speed.

4. A vehicle position information displaying apparatus according to claim 2, further comprising virtual road generating means for outputting information of a virtual straight road having a predetermined road width when it is determined that the present position of the user's vehicle is not detected.

5. A vehicle position information displaying apparatus according to claim 2, further comprising route determining means for determining a route to a destination, route inducing means for presenting the route to the destination to a user by virtue of at least one of voice and display, and route induction information selecting means for selecting information concerning said route from said map information so that the selected information is outputted.

6. A vehicle position information displaying apparatus according to claim 1, further comprising non-running road deleting means for deleting information of roads other than a running road of the user's vehicle from said map information on the basis of the present position of the user's vehicle so that the map information subjected to deletion is outputted.

7. A vehicle position information displaying apparatus according to claim 1, further comprising character/symbol information deleting means for deleting name information inclusive of place names and symbol information from said map information so that the map information subjected to deletion is outputted.

8. A vehicle position information displaying apparatus according to claim 1, further comprising background information deleting means for deleting background information inclusive of water systems and green zones other than roads from said map information so that the map information subjected to deletion is outputted.

9. A vehicle position information displaying apparatus according to claim 1, wherein said displaying means includes means for judging whether or not the information concerning the other vehicle should be displayed, the judgement being made on the basis of a map scale of the inputted map information.

10. A vehicle position information displaying apparatus according to claim 1, further comprising driving mechanism control means for controlling a driving mechanism of the user's vehicle so that the user's vehicle runs in a state in which an inter-vehicle distance between the user's vehicle and a target vehicle for follow-up is maintained at a set value, and activating means for activating said displaying means when said driving mechanism control means starts its operation.

11. A vehicle position information displaying apparatus according to claim 1, further comprising running condition dependent attribute selecting means for selecting information of a predetermined attribute from said map information in accordance with the running condition of the user's vehicle so that the selected attribute information is outputted.

12. A vehicle position information displaying apparatus according to claim 11, further comprising highway running judging means for judging whether or not the user's vehicle is running on a highway or an access road to the highway, said running condition dependent attribute selecting means selecting the highway or the access road to the highway when said highway running judging means determines that the user's vehicle is running on the highway.

13. A vehicle position information displaying apparatus according to claim 1, wherein said running condition dependent attribute selecting means selects the attribute in accordance with the detected speed of the user's vehicle.

14. A vehicle position information displaying method comprising the steps of:
    detecting a present position of a user's vehicle
    outputting map information of a predetermined area stored including the detected present position;
    detecting the position of another vehicle around the detected present position of the user's vehicle; and displaying the outputted map information, the detected present position of the user's vehicle and the detected position of the another vehicle in a superimposed manner on a display screen.

15. A vehicle position information displaying apparatus comprising:

map memory configured to output map information of a predetermined area stored therein;

a first detector apparatus configured to detect a user vehicle's present position;

a second detector apparatus configured to detect a position of another vehicle around the detected present position of the user's vehicle and to output information of the another vehicle's detected position; and a display configured to superimpose the map information, and information related to the user's vehicle present position and of the another vehicle's detected position on a display device.

16. A vehicle position information displaying apparatus according to claim 15, further comprising a selector configured to select road information of a running road of the user's vehicle from said map information on the basis of the user's vehicle present position and to output the selected road information.

17. A vehicle position information displaying apparatus o according to claim 16, further comprising a detector configured to detect a running speed of the user's vehicle, and a deletion stopper configured to stop operation of at least one of said running road selector, said non-running road deleter, said character/symbol information deleter and said background information deleter at a point where detected running speed of the user's vehicle is below a predetermined speed.

18. A vehicle position information displaying apparatus according to claim 16, further comprising a generator configured to output information of a virtual straight road having a predetermined road width upon a determination that the present position of the user's vehicle is not detected.

19. A vehicle position information displaying apparatus according to claim 16, further comprising a determinator device configured to determine a route to a destination, an inducer device configured to present the route to the destination to a user by at least one of voice and visual display, and a route induction information selector configured to select information concerning said route from said map information and to output the selected information.

20. A vehicle position information displaying apparatus according to claim 15, further comprising a deleter configured to delete information of roads other than a running road of the user's vehicle from said map information on the basis of the user's vehicle present position and to delete the map information subjected to deletion.

21. A vehicle position information displaying apparatus according to claim 15, further comprising a deleter configured to delete name information inclusive of place names and symbol information from said map information and to output the map information subjected to deletion.

22. A vehicle position information displaying apparatus according to claim 15, further comprising a deleter configured to delete background information inclusive of water systems and green zones other than roads from said map information and to output the map information subjected to deletion.

23. A vehicle position information displaying apparatus according to claim 15, wherein said display is configured to judge whether or not the information concerning the another vehicle should be displayed on the basis of a map scale of the map information.

24. A vehicle position information displaying apparatus according to claim 15, further comprising a controller configured to control a driving mechanism of the user's vehicle so that the user's vehicle runs in a state in which an inter-vehicle distance between the user's vehicle and a target vehicle for follow-up is maintained at a set value, and the display being configeed to be activated at start of operation of said controller.

25. A vehicle position information displaying apparatus according to claim 15, further comprising a running condition dependent attribute selector configured to select information of a predetermined attribute from said map information in accordance with the running condition of the user's vehicle and to output the selected attribute information.

26. A vehicle position information displaying apparatus according to claim 25, wherein said running condition dependent attribute selector is configured to select the attribute in accordance with a detected speed of the user's vehicle.

27. A vehicle position information displaying apparatus according to claim 25, further comprising a highway running judgment mechanism configured to judge if the user's vehicle is running on a highway or an access road to the highway, and said running condition dependent attribute selector being configured to select the highway or the access road to the highway when said highway running judgment mechanism determines that the user's vehicle is running on the highway.

* * * * *